US007554691B2

(12) United States Patent
Kakutani

(10) Patent No.: US 7,554,691 B2
(45) Date of Patent: Jun. 30, 2009

(54) PRINTER FOR PRINTING AN IMAGE ACCORDING TO PRESENCE/ABSENCE OF DOT FORMATION AND PRINTING CONTROL DEVICE THEREOF

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 577 days.

(21) Appl. No.: 10/549,206

(22) PCT Filed: Mar. 17, 2004

(86) PCT No.: PCT/JP2004/003606

§ 371 (c)(1),
(2), (4) Date: Sep. 15, 2005

(87) PCT Pub. No.: WO2004/082942

PCT Pub. Date: Sep. 30, 2004

(65) Prior Publication Data

US 2006/0176337 A1 Aug. 10, 2006

(30) Foreign Application Priority Data

Mar. 18, 2003 (JP) ............................ 2003-074138

(51) Int. Cl.
*H04N 1/40* (2006.01)

(52) U.S. Cl. ......................... 358/1.9; 358/505; 358/474

(58) Field of Classification Search ............. 347/40-43; 358/1.9, 2.1, 1.15-1.17, 505-508, 408, 474, 358/486-487, 494
See application file for complete search history.

(56) References Cited

U.S. PATENT DOCUMENTS 5,193,920 A * 3/1993 Matsumoto et al. ......... 400/582
5,422,666 A * 6/1995 Koyama ...................... 347/41
5,633,663 A * 5/1997 Matsubara et al. ............ 347/41
6,086,184 A 7/2000 Iwasaki et al.
2007/0057904 A1* 3/2007 Huang et al. ................ 345/103

FOREIGN PATENT DOCUMENTS

EP 0 715 448 10/1996
JP 08-150763 6/1996

(Continued)

OTHER PUBLICATIONS

Abstract of Japanese Patent Publication No. 08-150763, Pub. Date: Jun. 11, 1996, Patent Abstracts of Japan.

(Continued)

*Primary Examiner*—Thomas D Lee
*Assistant Examiner*—Stephen M Brinich
(74) *Attorney, Agent, or Firm*—Martine Penilla & Gencarella, LLP

(57) ABSTRACT

A printing system of the invention successively forms rasters or dot lines on a printing medium to complete a printed image. A raster formation assembly is scanned in a raster-forming direction relative to the printing medium and completes each raster on the printing medium by a preset number of multiple main scans. The printing system of the invention determines the dot on-off state of respective pixels included in an object image according to image data of the object image, stores data representing the determination results in a classified manner in a memory, and supplies data of each group read from the classified storage in the memory to the raster formation assembly. The determination results representing the dot on-off state of plural pixels on each raster are classified and stored into multiple groups according to allocation of the preset number of multiple main scans to raster formation in the plural pixels on the raster. Such classified storage remarkably simplifies the subsequent data output process that reads data of the determination results from the memory and supplies the read data to the raster formation assembly. This arrangement of the invention rationally rearranges the determination results of the dot on-off state in an order of dot formation, thus enhancing the image processing speed and effectively shortening the total time of image printing.

14 Claims, 21 Drawing Sheets

FOREIGN PATENT DOCUMENTS

| | | |
|---|---|---|
| JP | 10-278346 | 10/1998 |
| JP | 11-198356 | 7/1999 |
| JP | 2000-025208 | 1/2000 |
| JP | 2002-292850 | 10/2002 |

OTHER PUBLICATIONS

Abstract of Japanese Patent Publication No. 10-278346, Pub. Date: Oct. 20, 1998, Patent Abstracts of Japan.

Abstract of Japanese Patent Publication No. 11-198356, Pub. Date: Jul. 27, 1999, Patent Abstracts of Japan.

Abstract of Japanese Patent Publication No. 2000-025208, Pub. Date: Jan. 25, 2000, Patent Abstracts of Japan.

Abstract of Japanese Patent Publication No. 2002-292850 Pub. Date: Oct. 9, 2002, Patent Abstracts of Japan.

* cited by examiner

PRINTER FOR PRINTING AN IMAGE ACCORDING TO PRESENCE/ABSENCE OF DOT FORMATION AND PRINTING CONTROL DEVICE THEREOF

TECHNICAL FIELD

The present invention relates to a technique of creating dots on a printing medium to print an image. More specifically the invention pertains to a technique of processing data for controlling dot formation, prior to or synchronously with actual image printing.

BACKGROUND ART

Dot printers that create dots on printing media to print images are widely used as an output device of images generated by computers and images taken by digital cameras. The dot printer, for example, an inkjet printer, has a print head for dot formation on a printing medium and creates dots with a relative positional shift of the print head to the printing medium to complete a printed image.

The dot printer does not sequentially create dots from one end of an image. In a printing device that scans a print head relative to a printing medium and creates dots to form rasters or dot lines and complete a printed image, for the enhanced picture quality, each raster is not formed by only one scan but is completed by multiple scans. In the technique of completing each raster by multiple scans of the print head, the sequence of dots on rasters of an image may not be consistent with the order of dot formation. In the dot printer that creates dots in a different order from the sequence of dots on rasters of one image, one proposed technique determines the dot on-off state of respective pixels included in the image and rearranges dot data representing the determination results of the dot on-off state in the order of dot formation (see, for example, Japanese Patent Laid-Open Gazette No. 2002-292850).

The rearrangement of the dot data in the order of dot formation by this prior art technique, however, takes a relatively long time. This time-consuming rearrangement is one factor of interference with the high-speed image printing.

The object of the invention is thus to eliminate the drawbacks of the prior art technique and to provide a technique that rationally rearranges dot data representing determination results of dot on-off state in an order of dot formation and thereby ensures high-speed image printing.

DISCLOSURE OF THE INVENTION

In order to attain at least part of the above and the other related objects, the present invention is directed to a printing device that prints an image on a printing medium. The printing device includes: a raster formation assembly that is scanned in a raster-forming direction relative to the printing medium and completes each raster or each dot line on the printing medium by a preset number of multiple scans; a shift module that shifts the raster formation assembly in a perpendicular direction orthogonal to the raster-forming direction relative to the printing medium after every scan of the raster formation assembly in the raster-forming direction for raster formation; an image data receiving module that receives object image data representing an object image to be printed; a dot on-off state determination module that determines dot on-off state with regard to a number of pixels constituting the object image, based on the received image data; a determination result storage module that classifies determination results representing dot on-off state of plural pixels on each raster into multiple groups according to allocation of the preset number of multiple scans to raster formation in the plural pixels on the raster and stores the determination results classified in the multiple groups; and a determination result supply module that reads the determination results of each classified group from the classified storage of the determination result storage module synchronously with each scan of the raster formation assembly in the raster-forming direction, and supplies the read determination results of each classified group to the raster formation assembly, which then creates dots in dot-on pixels to complete each raster on the printing medium according to the supplied determination results of each classified group.

There is a print control device corresponding to the printing device of the invention discussed above. The present invention is thus directed to a print control device that supplies control data to a printing unit to print an image. The printing unit has a raster formation assembly that is scanned in a raster-forming direction relative to a printing medium and completes each raster or each dot line on the printing medium by a preset number of multiple scans. The print control device includes: an image data receiving module that receives object image data representing an object image to be printed; a dot on-off state determination module that determines dot on-off state with regard to a number of pixels constituting the object image, based on the received image data; a determination result storage module that classifies determination results representing dot on-off state of plural pixels on each raster into multiple groups according to allocation of the preset number of multiple scans to raster formation in the plural pixels on the raster and stores the determination results classified in the multiple groups; and a control data supply module that reads the determination results of each classified group from the classified storage of the determination result storage module synchronously with each scan of the raster formation assembly in the raster-forming direction, and supplies the read determination results of each classified group to the printing unit as the control data for controlling dot formation by the raster formation assembly.

There is also a print control method corresponding to the print control device of the invention discussed above. The invention is accordingly directed to a print control method that supplies control data to a printing unit to control image printing. The printing unit has a raster formation assembly that is scanned in a raster-forming direction relative to a printing medium and completes each raster or each dot line on the printing medium by a preset number of multiple scans. The print control method includes the steps of: receiving object image data representing an object image to be printed; determining dot on-off state with regard to a number of pixels constituting the object image, based on the received image data; classifying determination results representing dot on-off state of plural pixels on each raster into multiple groups according to allocation of the preset number of multiple scans to raster formation in the plural pixels on the raster and storing the determination results classified in the multiple groups; and reading the determination results of each classified group from storage of the determination result storage module synchronously with each scan of the raster formation assembly in the raster-forming direction, and supplying the read determination results of each classified group to the printing unit as the control data for controlling dot formation by the raster formation assembly.

The printing device, the print control device, and the print control method of the invention determine the dot on-off state of respective pixels constituting an image and store the determination results in the classified manner. Each raster is completed by the preset number of multiple scans of the raster formation assembly. The determination results representing the dot on-off state of plural pixels on each raster are classified and stored into the multiple groups according to allocation of the preset number of multiple scans to raster formation in the plural pixels on the raster. Data representing the determination results of each group are read from the classified storage and are supplied to the raster formation assembly.

The raster formation assembly creates dots and completes each raster by the preset number of multiple scans. The determination results of the dot on-off state with regard to pixels on each raster as objects of simultaneous dot formation are supplied synchronously with each scan of the raster formation assembly. The determination results of plural pixels on each raster are classified and stored into the multiple groups according to allocation of the preset number of multiple scans of the raster formation assembly to raster formation in the plural pixels on the raster. The determination results of each group are then supplied to the raster formation assembly. This arrangement desirably simplifies the supply of the determination results to the raster formation assembly and thus enables the high-speed image processing.

In any of the printing device, the print control device, and the print control method of the invention, one preferable embodiment sets a unit of each classified group to an integral multiple of a standard data volume adopted for data transmission, and classifies and stores the determination results representing the dot on-off state of the plural pixels on each raster into the multiple groups of the set units. The integral multiple of the standard data volume includes the standard data volume itself.

Each of CPUs and diversity of other processors used for processing image data has a preset standard data volume (for example, 8 bits, 16 bits, or 32 bits). Setting this standard data volume to the unit of processing ensures the efficient, high-speed processing. The determination result of the dot on-off state with regard to each pixel generally requires a smaller data volume than the standard data volume. This preferable embodiment classifies and stores the determination results of the dot on-off state into the multiple groups in the units of the integral multiple of the standard data volume. The classified storage of data and the supply of data read from the classified storage to the raster formation assembly are performed in the units of the standard data volume. This arrangement thus ensures the efficient, high-speed image processing.

The data read from the classified storage in the multiple groups in the units of the integral multiple of the standard data volume represent the determination results of the dot on-off state with regard to only relevant pixels. Such classified storage of the embodiment does not require any additional process of extracting data of the relevant pixels out of the read-out data or collecting the read-out data to data of the relevant pixels. This arrangement ensures the high-speed data supply of the determination results of the dot on-off state to the raster formation assembly.

In any of the printing device, the print control device, and the print control method of the invention, another preferable embodiment sets a unit of each classified group to an integral multiple of a standard data volume adopted for data transmission in the print control device, and classifies and stores the determination results representing the dot on-off state of the plural pixels on each raster into the multiple groups of the set units.

This arrangement simplifies the supply of the determination results of the dot on-off state synchronously with each scan of the raster formation assembly.

In any of the printing device, the print control device, and the print control method of the invention, another preferable embodiment classifies and stores the determination results of the dot on-off state of the plural pixels on each raster into the multiple groups, based on pixel numbers or ordinal numbers assigned to the plural pixels on the raster from a head of the raster.

When each raster is completed by the preset number of multiple scans of the raster formation assembly, the allocation of the preset number of multiple scans to raster formation in plural pixels on each raster typically depends on the pixel numbers assigned to the respective pixels. The classified storage of the determination results based on the pixel numbers thus desirably ensures adequate classification in the multiple groups.

One preferable procedure for the classified storage of the determination results based on the pixel numbers classifies and stores the determination results of the dot on-off state of the plural pixels on each raster into the multiple groups, based on residues obtained by dividing the pixel numbers by the preset number of multiple scans for raster formation.

The allocation of the preset number of multiple scans to raster formation in plural pixels on each raster typically depends on the residues obtained by dividing the pixel numbers by the preset number of multiple scans. The classified storage of the determination results based on the residues attains the simple and adequate classification in the multiple groups.

In one preferable embodiment of the invention, the raster formation assembly changes the number of multiple scans for raster formation to print the object image, while shifting the raster formation assembly in a perpendicular direction orthogonal to the raster-forming direction relative to the printing medium after every scan of the raster formation assembly in the raster-forming direction for raster formation. In this embodiment, the procedure selects major rasters among a number of rasters constituting the image, where each of the major rasters is formed by a major number of multiple scans out of plurality of the changing numbers of multiple scans for raster formation to complete the printed image. The procedure then classifies and stores the determination results with regard to plural pixels on each selected major raster into multiple groups corresponding to the major number of multiple scans in the raster-forming direction for formation of each major raster. The procedure supplies the determination results of the dot on-off state read from the classified storage to the raster formation assembly. The determination results of each classified group may be read from the storage and supplied to the raster formation assembly, with regard to the pixels of the major rasters.

The major rasters occupy a high fraction to the total number of rasters constituting the image. The determination results with regard to plural pixels on each major raster are classified and stored into multiple groups corresponding to the major number of multiple scans in the raster-forming direction for formation of each major raster. Even when the determination results with regard to pixels on residual raters other than the major rasters are not stored in multiple classified groups corresponding to the number of multiple scans for raster formation, this arrangement enhances the total image printing speed. This arrangement is also readily applicable to a printing system of printing an image with a complicated change in number of scans of the raster formation assembly.

The determination results with regard to plural pixels on each of residual rasters may be classified and stored into multiple groups corresponding to the major number of multiple scans in the raster-forming direction for formation of each major raster. Each of the residual rasters is other than the major rasters among the number of rasters constituting the image and is formed by another number of multiple scans different from the major number of multiple scans. One applicable procedure selects the determination results with regard to pixels on each residual raster as objects of simultaneous dot formation by each of the residual number of multiple scans from the classified storage of the determination results, synchronously with each scan of the raster formation assembly in the raster-forming direction. The selected determination results are then supplied to the raster formation assembly.

The classified storage with regard to the pixels of the residual rasters as well as the pixels of the major rasters enables all the pixels included in one image to be classified and stored in one identical manner. This arrangement desirably simplifies and accelerates the processing.

The determination results with regard to plural pixels on each of residual rasters may otherwise be not classified into groups but may be stored in a sequence of pixel arrays on the image. One applicable procedure selects the determination results with regard to pixels on each residual raster as objects of simultaneous dot formation by each of the residual number of multiple scans from the storage of the determination results, synchronously with each scan of the raster formation assembly in the raster-forming direction. The selected determination results are then supplied to the raster formation assembly. This arrangement does not require the classified storage with regard to the pixels of the residual rasters, thus simplifying the processing.

The print control method of the invention may be attained by the computer that executes a program of the required functions and controls the printing unit. The technique of the invention may thus be actualized by a program and a recording medium with the program recorded therein.

BEST MODES OF CARRYING OUT THE INVENTION

Figure 1:
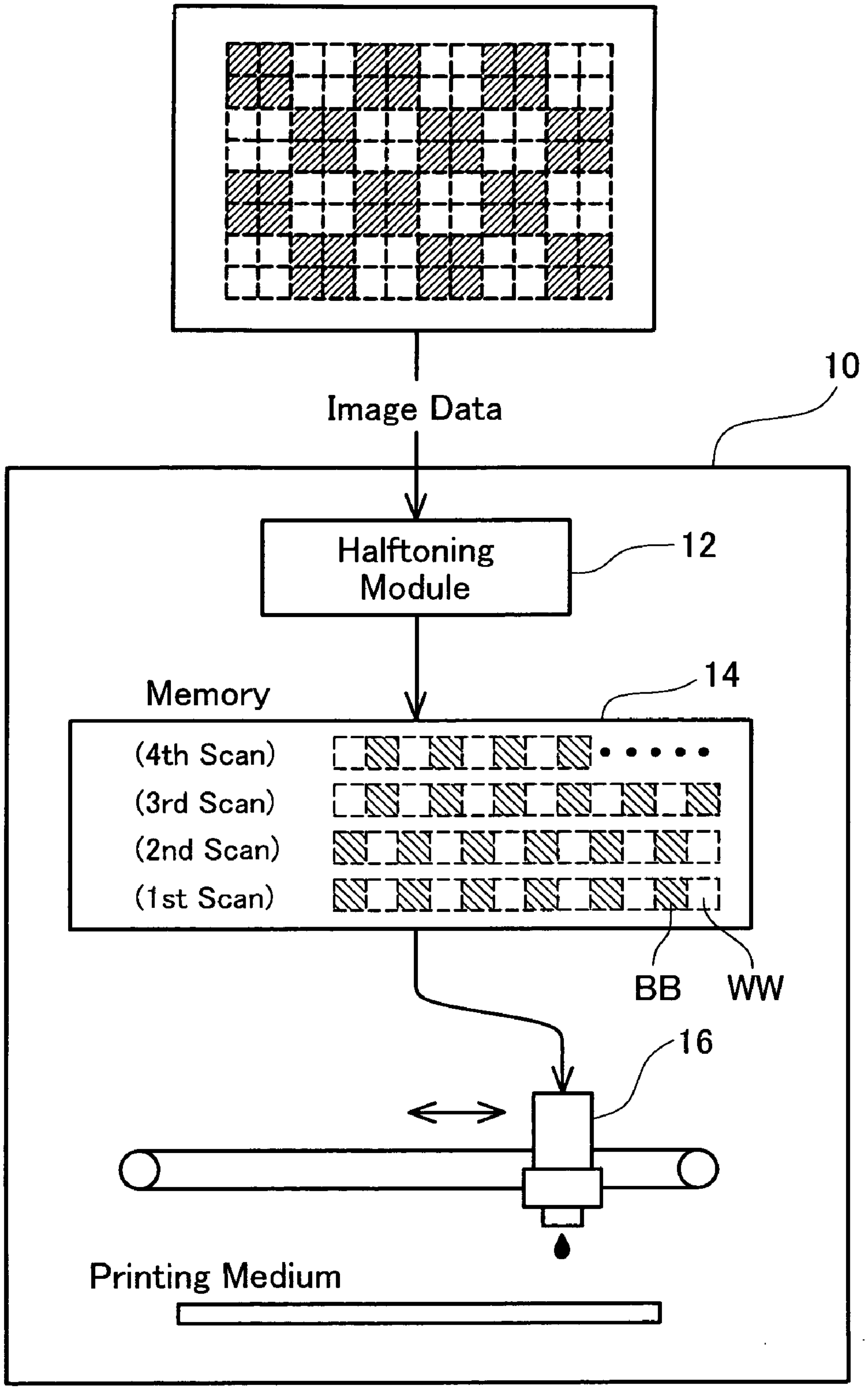
FIG. 1 conceptually shows the outline of the invention.

The invention is described in detail with reference to a preferable embodiment in the following sequence, in order to clarify the features, aspects, and effects of the invention:

A. General Outline
B. System Configuration
C. Outline of Image Processing
D. Halftoning Process
E. Data Output Process
F. Modifications A. General Outline The general outline of the invention is described below, prior to detailed description of a preferred embodiment. FIG. 1 conceptually shows the outline of a printing system 10 embodying the invention. As illustrated, the printing system 10 includes a halftoning module 12 that makes input image data subjected to a preset series of image processing, a raster formation assembly 16 that forms rasters or dot lines on a printing medium, and a memory 14 that stores data required for dot formation by the raster formation assembly 16. The raster formation assembly 16 creates dots and completes rasters, while moving back and forth (scanning) a preset number of times in a raster-forming direction relative to the printing medium. The raster formation assembly 16 also moves relative to the printing medium in a direction perpendicular to the rasters after every scan for raster formation.

In response to supply of image data to the printing system 10, the halftoning module 12 determines the dot on-off state of respective pixels constituting an object image, based on the input image data. The determination results are temporarily stored in the memory 14, are read out in synchronism with motions of the raster formation assembly 16, and are output as control data to the raster formation assembly 16. The raster formation assembly 16 is scanned in the raster-forming direction relative to the printing medium, so as to create dots according to the input control data. Rasters or dot lines are accordingly formed on the printing medium. After every scan for raster formation, the raster formation assembly 16 is moved relative to the printing medium in the direction perpendicular to the raster-forming direction. This series of processing completes a two-dimensional printed image.

In the illustrated example of FIG. 1, an object image to be printed has a checkered pattern of white image areas and black image areas. For the simplicity of explanation, in this example, the halftone module 12 sets the dot-on state in pixels of the black areas of the checkered pattern and the dot-off state in pixels of the white areas of the checkered pattern. The raster formation assembly 16 completes each raster by two scans in the raster-forming direction. A first scan creates dots in pixels of odd ordinal numbers on each raster, and a second scan creates dots in pixels of even ordinal numbers on the raster. The printing system 10 does not adopt the bidirectional printing technique but creates dots only in a forward motion or a backward motion of each scan in the raster-forming direction.

The halftoning module 12 determines the dot on-off state of respective pixels on each raster, classifies the determination results regarding the raster into multiple groups according to allocation of the two scans for dot formation to the respective pixels on the raster, and stores the determination results in the classified groups in the memory 14. As mentioned above, the first scan creates dots in the pixels of the odd ordinal numbers on each raster, whereas the second scan creates dots in the pixels of the even ordinal numbers on the raster. The determination results are accordingly divided into a group of determination result representing the dot on-off state of the pixels of the odd ordinal numbers and a group of determination result representing the dot on-off state of the pixels of the even ordinal numbers. In the illustrated example of FIG. 1, a first array of the memory 14 stores a group of determination result representing the dot on-off state of pixels of odd ordinal numbers on a first raster formed by a first scan. A second array of the memory 14 stores a group of determination result representing the dot on-off state of pixels of even ordinal numbers on the first raster completed by a second scan. In the memory 14 of FIG. 1, each hatched square BB represents a pixel in the dot-on state and each open square WW represents a pixel in the dot-off state. Similarly a third array of the memory 14 stores a group of determination result representing the dot on-off state of pixels of odd ordinal numbers on a next raster formed by a third scan. A fourth array of the memory 14 stores a group of determination result representing the dot on-off state of pixels of even ordinal numbers on the next raster completed by a fourth scan. In this manner, the memory 14 alternately stores the group of determination result with regard to pixels of odd ordinal numbers on each raster and the group of determination result with regard to pixels of even ordinal numbers on the raster.

In the illustrated example of FIG. 1, for the better understanding, the number of odd ordinal pixels or even ordinal pixels included in each group is consistent with the number of pixels included in each array of the memory 14. In the actual state, however, the number of pixels included in each group may be consistent with or inconsistent with the number of pixels included in each array of the memory 14.

As described above, the halftoning module 12 of this printing system 10 classifies the determination results of the dot on-off state with regard to each raster into multiple groups according to allocation of two scans for dot formation to the respective pixels on the raster and stores the determination results in the classified groups in the memory 14. As clearly shown in FIG. 1, the sequence of storage of the determination results in the memory 14 is accordingly different from the sequence of pixel arrays of a resulting image. Classified storage of the determination results representing the dot on-off state of the respective pixels on each raster in multiple groups facilitates and simplifies the process of reading out the determination results from the memory 14 and supplying the determination results as control data to the raster formation assembly 16. This arrangement thus ensures high-speed image printing. These features, characteristics, and aspects of the invention are described more in detail with reference to a preferred embodiment.

Figure 2:
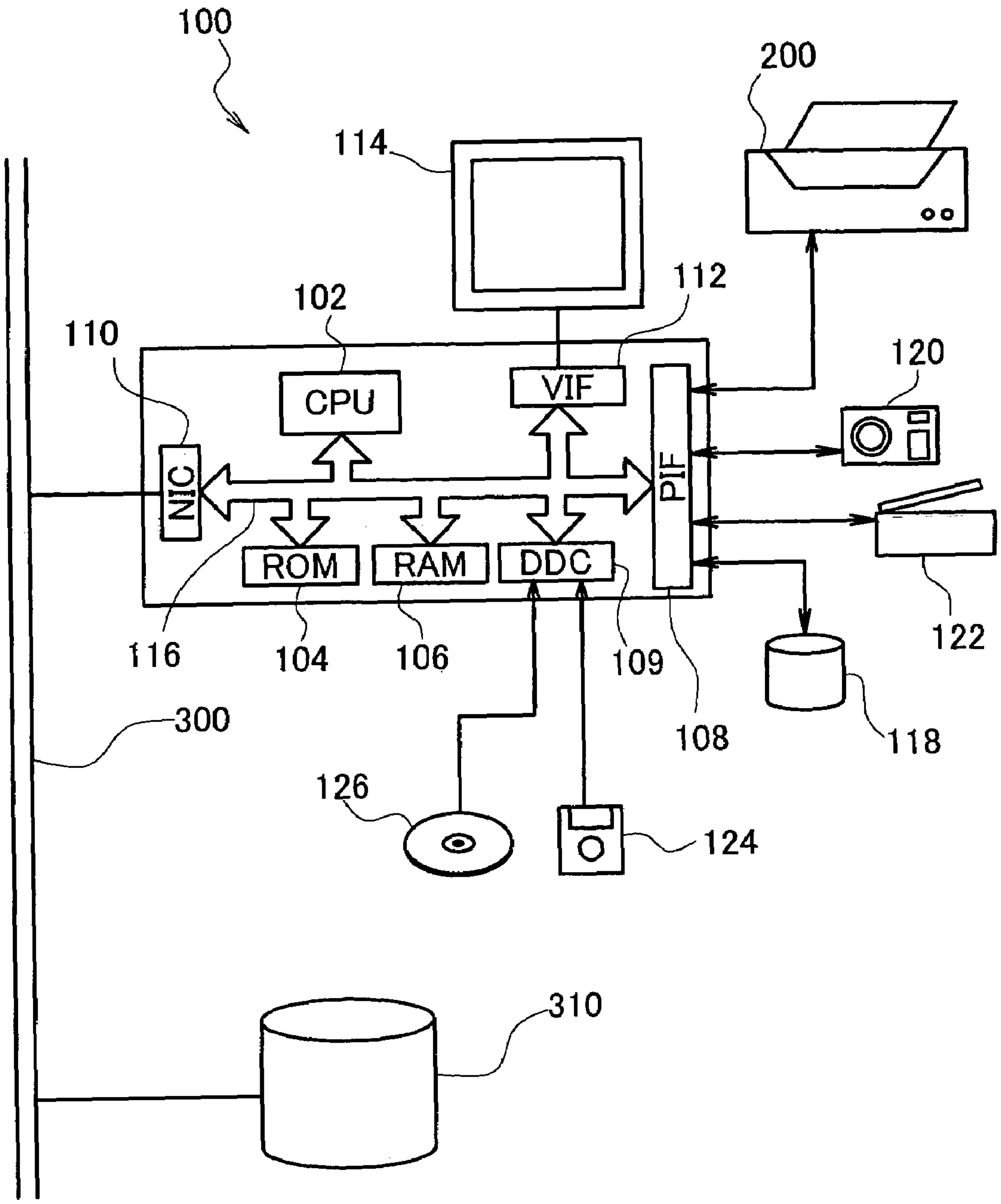
FIG. 2 schematically illustrates the configuration of a computer working as an image processing device in one embodiment of the invention.

B. System Configuration FIG. 2 schematically illustrates the configuration of a computer 100 working as an image processing device in one embodiment of the invention. The computer 100 includes a CPU 102, a ROM 104, and a RAM 106 interconnected via a bus 116. The computer 100 has a disk controller DDC 109 to read data from, for example, a flexible disk 124 or a compact disc 126, a peripheral equipment interface (hereafter referred to as PIF) 108 to receive and send data from and to peripheral equipment, and a video interface (hereafter referred to as VIF) 112 to drive and actuate a CRT 114. The PIF 108 is connected to a printer 200 described later and to a hard disk unit 118. Connection of a digital camera 120 and a color scanner 122 to the PIF 108 enables images taken by the digital camera 120 and the color scanner 122 to be processed and printed by the printer 200. Insertion of a network interface card (hereafter referred to as NIC) 110 into the computer 100 enables the computer 100 to establish connection with a communication line 300 and obtain data stored in a storage device 310 linked to the communication line 300.

Figure 3:
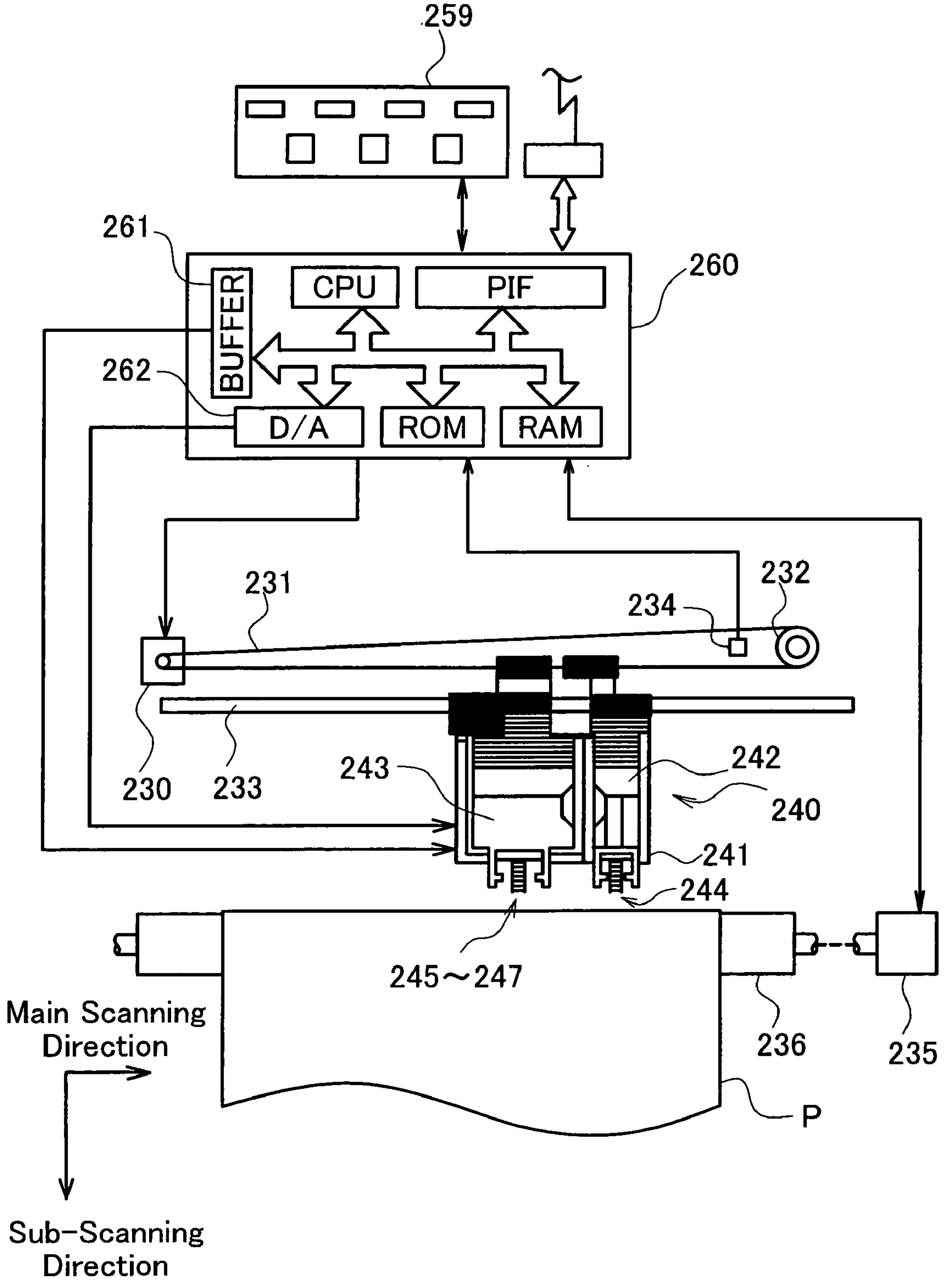
FIG. 3 schematically illustrates the structure of a printer in the embodiment.

FIG. 3 schematically illustrates the structure of the printer 200 in this embodiment. The printer 200 is an inkjet printer that is capable of creating dots of four color inks, cyan, magenta, yellow, and black. The inkjet printer may be capable of creating dots of six color inks, cyan ink of a lower dye density (light cyan ink) and magenta ink of a lower dye density (light magenta ink), in addition to the above four color inks. In the description below, cyan ink, magenta ink, yellow ink, and black ink may be expressed simply as C ink, M ink, Y ink, and K ink, respectively.

As illustrated, the printer 200 has a mechanism of actuating a print head 241 mounted on a carriage 240 to eject inks and create dots, a mechanism of activating a carriage motor 230 to move the carriage 240 back and forth along a shaft of a platen 236 (hereafter referred to as main scanning direction), a mechanism of activating a paper feed motor 235 to feed printing paper P in a direction perpendicular to the main scanning direction (hereafter referred to as sub-scanning direction), and a control circuit 260 that controls the formation of dots, the scan of the carriage 240, and the feed of the printing paper P.

An ink cartridge 242 for storing the K ink and an ink cartridge 243 for storing the C, M, and Y inks are attached to the carriage 240. The respective inks in the ink cartridges 242 and 243 attached to the carriage 240 are supplied through non-illustrated ink conduits to corresponding ink ejection heads 244 through 247 of the respective colors formed on the bottom face of the print head 241. The ink ejection heads 244 through 247 of the respective colors eject ink droplets of the supplied inks to create ink dots on the printing paper P as the printing medium.

The control circuit 260 includes a D/A converter 262 that converts digital data into analog signals and a drive buffer 261 that temporarily stores data to be supplied to the print head 241, in addition to a CPU, a ROM, a RAM, and a peripheral equipment interface PIF. The control circuit 260 may alternatively have no CPU but actualize the required functions by the discrete hardware or firmware configuration. The control circuit 260 controls the operations of the carriage motor 230 and the paper feed motor 235 to regulate main scans and sub-scans of the carriage 240. The control circuit 260 also drives the print head 241 at adequate timings in synchronism with the main scans and the sub-scans of the carriage 240. The print head 241 receives supply of control data representing the dot on-off state from the drive buffer 261 and is driven in response to output of a drive signal at a desired timing from the D/A converter 262. The mechanism of outputting the control data and the drive signal to drive the print head 241 and eject ink droplets will be discussed later with reference to other drawings. Under control of the control circuit 260, ink droplets are ejected from the ink ejection heads 244 through 247 of the respective colors at adequate timings to form ink dots and complete a printed color image on the printing paper P.

Any of diverse methods may be adopted to eject ink droplets from the ink ejection heads of the respective colors. One applicable method uses piezoelectric elements for ink ejection. Another applicable method uses heaters that are located in ink conduits and are actuated to produce bubbles in the ink conduits for ejection of ink droplets. The technique of this embodiment is not restricted to the ink ejection-type printers but may also be applied to printers that take advantage of thermal transfer to create ink dots on a printing medium and printers that take advantage of static electricity to make respective color toners adhere to a printing medium.

Figure 4:
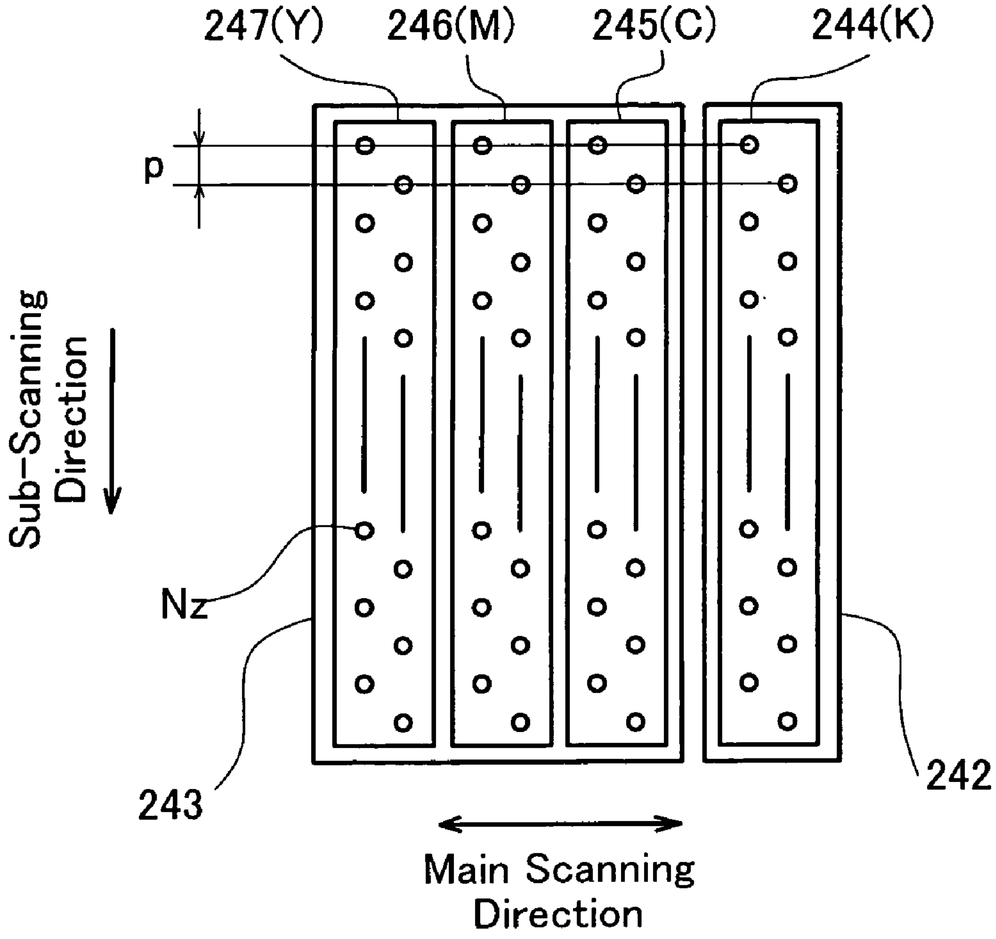
FIG. 4 shows an arrangement of nozzles formed in bottom faces of ink ejection heads.

FIG. 4 shows an arrangement of multiple nozzles Nz for ejection of ink droplets, which are formed in the bottom faces of the ink ejection heads 244 through 247 of the respective colors. As illustrated, four nozzle arrays are formed in the bottom faces of the ink ejection heads 244 through 247 of the respective colors to eject respective color ink droplets. Each nozzle array includes 48 nozzles Nz arranged in zigzag at intervals of a nozzle pitch k. Among these nozzles Nz, nozzles receiving control data of the dot-on state simultaneously eject ink droplets in response to the drive signal output from the control circuit 260. This mechanism is described below with reference to FIG. 5.

Figure 5:
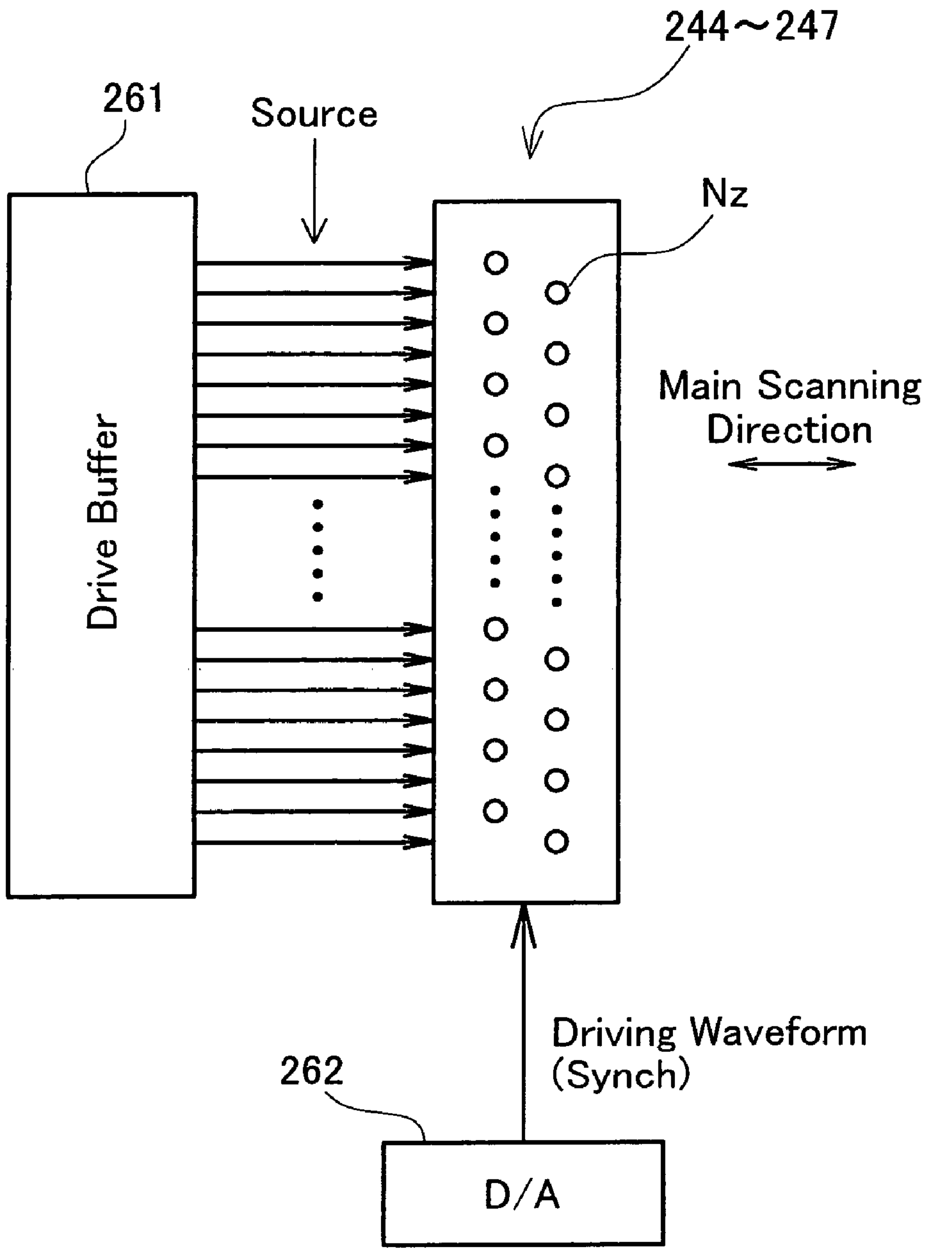
FIG. 5 conceptually shows a mechanism of ejection of ink droplets from nozzles under control of a control circuit.

FIG. 5 conceptually shows the mechanism how the ink ejection heads 244 through 247 eject ink droplets according to the control data in response to the output of the drive signal. As shown in FIG. 4, the multiple nozzles Nz are formed in the bottom faces of the respective ink ejection heads 244 through 247. Non-illustrated piezoelectric elements are provided as driving elements for ejection of ink droplets in non-illustrated ink conduits connected to the respective nozzles Nz. Respective signal lines from the drive buffer 261 are connected to a source circuit for driving the corresponding piezoelectric elements. A signal line from the D/A converter 22 is connected to a synch circuit for collectively driving multiple piezoelectric elements. In response to output of the drive signal from the D/A converter 262, only the nozzles Nz receiving control data '1', which represents selected nozzles, from the drive buffer 261 are activated to eject ink droplets and create dots. The nozzles Nz receiving control data '0', which represents non-selected nozzles, from the drive buffer 261 are, on the other hand, not activated to eject ink droplets by the output of the drive signal. Namely only the selected nozzles according to the control data are driven to eject ink droplets, among the multiple nozzles Nz formed in the ink ejection heads 244 through 247.

The control circuit 260 of FIG. 3 outputs the control data for controlling ejection of ink droplets and the drive signal to the respective ink ejection heads 244 through 247, synchronously with main scans and sub-scans of the carriage 240. Ink dots are thus created at adequate positions on the printing paper P to complete a resulting printed image.

Figure 6:
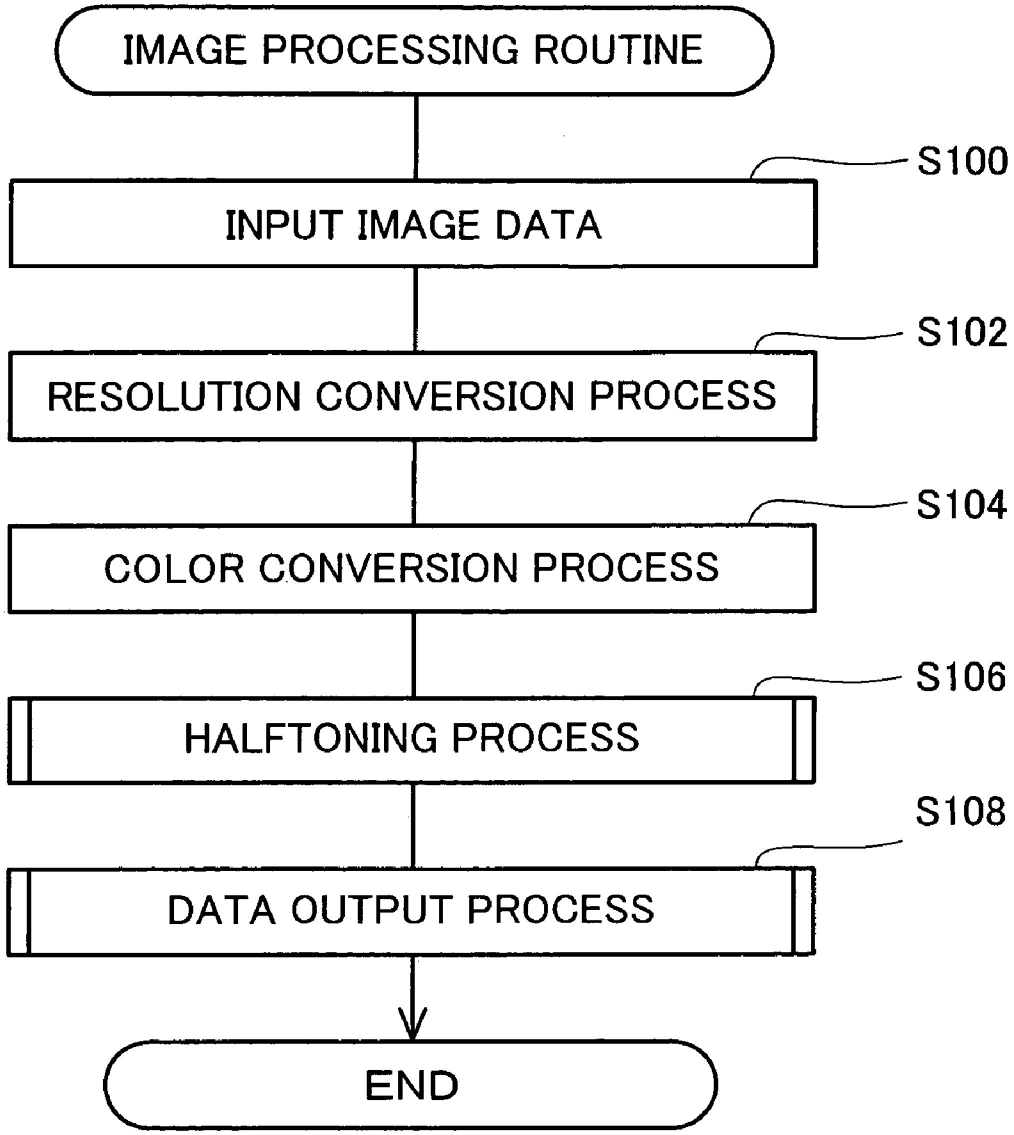
FIG. 6 is a flowchart showing an image processing routine of the embodiment.

C. Outline of Image Processing The control data used for controlling ejection of ink droplets are generated when an object image to be printed goes through a preset series of image processing. FIG. 6 is a flowchart showing an image processing routine of this embodiment that is mainly executed by the functions of the CPU 102 included in the computer 100. The outline of image processing is described below with reference to the flowchart of FIG. 6.

The image processing routine first reads object image data representing an object image to be printed (step S100). In this embodiment, the input object image data are RGB color image data expressed by 256 tones in a tone value range of 0 to 255 with regard to respective colors R, G, and B. The object image data are not restricted to the RGB color image data but may be any image data in any other known format.

The input object image data go through a resolution conversion process, which converts the resolution of the input image data into a printing resolution set in the printer 200 (step S102). The resolution conversion process generates new data between the existing image data by linear interpolation to attain conversion to the printing resolution, when the resolution of the input image data is lower than the printing resolution. When the resolution of the input image data is higher than the printing resolution, on the other hand, the resolution conversion process skips the existing image data at a preset rate to attain conversion to the printing resolution.

The resolution-converted image data subsequently go through a color conversion process (step S104). The color conversion process converts the RGB image data expressed by combinations of tone values of the colors R, G, and B into image data expressed by combinations of tone values of respective colors used for printing. As mentioned above, the printer 200 prints an image with the four color inks C, M, Y, and K. The color conversion process of this embodiment accordingly converts the RGB image data expressed by the tone values of the colors R, G, and B into image data expressed by the tone values of the four colors C, M, Y, and K. The procedure of color conversion refers to a three-dimensional numerical table called a color conversion table (look up table: LUT). The LUT stores a mapping of the tone values of the respective colors C, M, Y, and K to the RGB image data. Reference to the LUT thus ensures quick color conversion. The color conversion may alternatively be attained according to a conversion determinant.

The color-converted image data then go through a halftoning process (step S106). The halftoning process changes the number of tones of the image data. The color-converted image data of, for example, 1 byte is tone data expressed by 256 tones in the tone value range of 0 to 255 with regard to each pixel. The printer 200, on the other hand, takes only either of a 'dot-on' state or a 'dot-off' state in each pixel on the printing paper. It is accordingly required to convert the 256-tone data into 2-tone data representing the dot-on state and the dot-off state. The halftoning process converts the 256-tone image data into data representing the dot on-off state. In the case of fixed settings to both the dot size and the dot density, the halftoning process converts the 256-tone image data into 2-tone data (binarization). In the case of two variable dot densities, for example, high density and low density, the halftoning process converts the 256-tone image data into 3-tone data. In the case of three variable dot sizes, for example, large, medium, and small sizes, the halftoning process converts the 256-tone image data into 4-tone data.

The halftoning-processed data are stored in the RAM 106 of the computer 100, are transferred to the printer 200, and are supplied from the drive buffer 261 to the ink ejection heads 244 through 247. The ink ejection heads 244 through 247 are scanned on the printing medium and create dots to form rasters or dot lines and thereby complete a resulting printed image. Each raster is not formed by one scan but is completed by multiple scans for the better picture quality of the resulting printed image. The halftoning process of this embodiment classifies the determination results of the dot on-off state with regard to each raster into multiple groups according to allocation of the multiple scans for dot formation to respective pixels on the raster and stores the determination results in the classified groups in the RAM 106. The details of the halftoning process of the embodiment will be described later with reference to other drawings.

The halftoning-processed data are read from the RAM 106 of the computer 100, are transferred to the drive buffer 261 of the printer 200, and are output as control data from the drive buffer 261 to the ink ejection heads 244 through 247 (step S108). In this embodiment, the halftoning-processed data regarding each raster are classified into multiple groups according to allocation of the multiple scans for dot formation to respective pixels on the raster and are stored in the multiple groups in the RAM 106. This significantly simplifies and facilitates the process of reading the data from the RAM 106 and transferring the data to the printer 200. The details of this process will also be described later with reference to other drawings. As mentioned above with reference to FIG. 5, each of the ink ejection heads 244 through 247 simultaneously ejects ink droplets from the respective nozzles according to the input control data. A resulting printed image according to the image data is thus completed on the printing paper.

D. Halftoning Process

Figure 7:
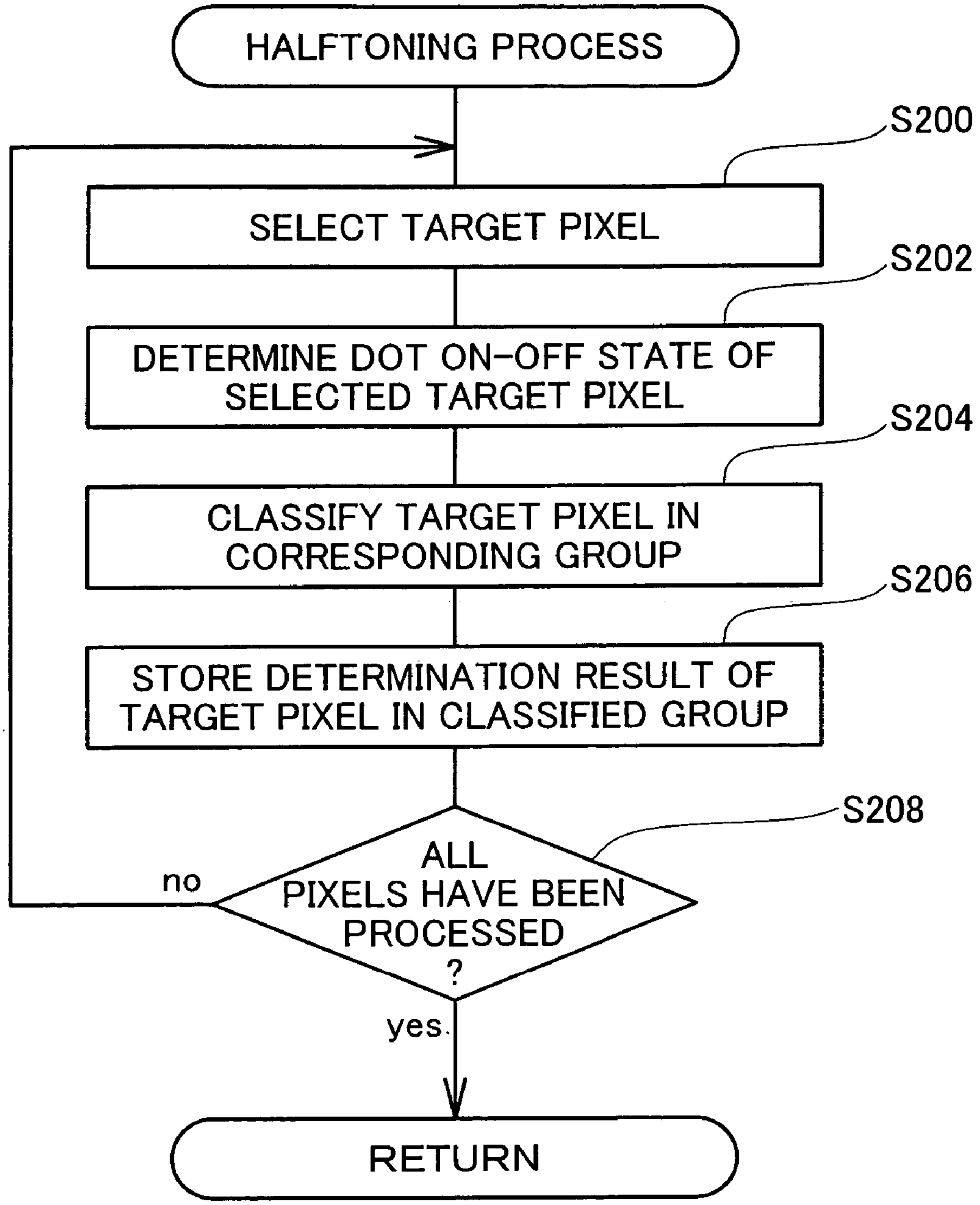
FIG. 7 is a flowchart showing the details of a halftoning process in the image processing routine of the embodiment.

The following describes the details of the halftoning process of the embodiment executed in the image processing routine of FIG. 6. FIG. 7 is a flowchart showing the details of the halftoning process executed in this embodiment.

The halftoning process first selects a target pixel as an object of determination of the dot on-off state among multiple pixels constituting an object image (step S200). The object image consists of multiple pixels arranged in columns and rows of a lattice pattern. The halftoning process sets selected one of the multiple pixels to the target pixel at step S200.

The halftoning process then determines the dot on-off state of the selected target pixel according to the input image data (step S202). Any of diverse known techniques, for example, the error diffusion technique and the dither technique, may be adopted to determine the dot on-off state of the target pixel.

Figure 8:
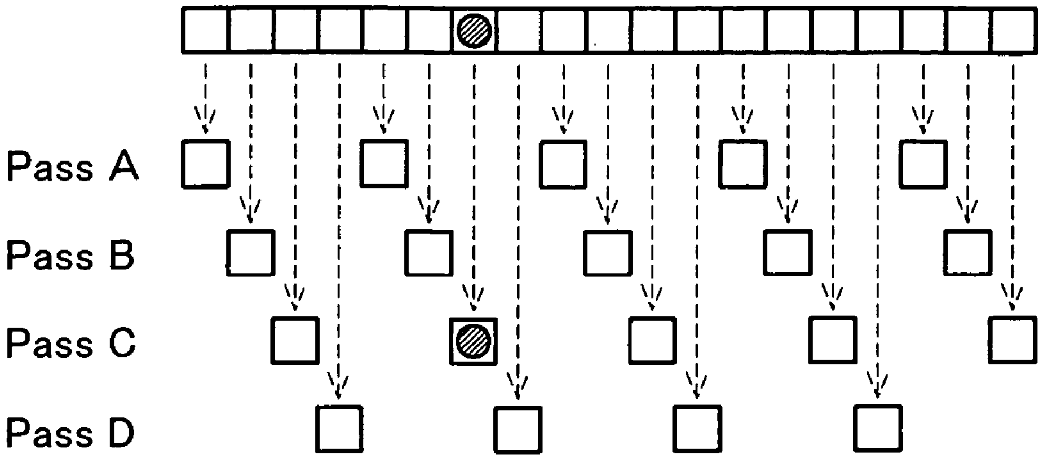
FIG. 8 shows one example of classification of pixels on one raster into multiple groups of print passes.

After determination of the dot on-off state of the selected target pixel, the halftoning process classifies the target pixel in one of multiple groups (step S204). The procedure of the classification is described with reference to FIG. 8. FIG. 8 conceptually shows one pixel array aligned in the main scanning direction and extracted from multiple pixels of an image arranged in a lattice pattern. Each raster is formed by creating dots in each pixel array. As mentioned above, the printer 200 moves the print head 241 back and forth in the main scanning direction and creates dots on the printing paper. All the dots included in each raster may be created by only one main scan. This one-scan dot formation is, however, adopted only in a printing speed priority mode. In other print modes, for the better picture quality of a resulting printed image, each raster is generally formed by multiple main scans.

In the illustrated example of FIG. 8, dot formation on one raster is completed by four main scans, that is, pass A, pass B, pass C, and pass D. The pass A creates dots in a $1^{st}$ pixel on the raster (the pixel on the left-most end) and subsequent every $4^{th}$ pixels, for example, in a $5^{th}$ pixel, a $9^{th}$ pixel, and a $13^{th}$ pixel. The pass B creates dots in a $2^{nd}$ pixel on the raster and subsequent every $4^{th}$ pixels, for example, in a $6^{th}$ pixel and a $10^{th}$ pixel. The pass C creates dots in a $3^{rd}$ pixel on the raster and subsequent every $4^{th}$ pixels, for example, in a $7^{th}$ pixel and an $11^{th}$ pixel. The pass D creates dots in a $4^{th}$ pixel on the raster and subsequent every $4^{th}$ pixels, for example, in an $8^{th}$ pixel and a $12^{th}$ pixel. In this example of FIG. 8, dots are accordingly created in all the pixels on the raster by the passes A through D. The halftoning process of FIG. 7 classifies the target pixel into one of the multiple groups according to allocation of the pass for dot formation to the target pixel at step S204.

In this illustrated example of FIG. 8, each of the passes A through D creates dots in every $4^{th}$ pixels. Application of the residue system thus facilitates classification in the multiple groups. The pass A creates dots in the $1^{st}$ pixel and subsequent every $4^{th}$ pixels, for example, the $5^{th}$ pixel and the $9^{th}$ pixel. When the residue by division of the ordinal number of a target pixel by 4 is equal to '1', the pass A is selected for dot formation in the target pixel. In a similar manner, when the residue by division of the ordinal number of a target pixel by 4 is equal to '2', the pass B is selected for dot formation in the target pixel. When the residue by division of the ordinal number of a target pixel by 4 is equal to '3', the pass C is selected for dot formation in the target pixel. When the residue by division of the ordinal number of a target pixel by 4 is equal to '0', that is, when the ordinal number of the target pixel is divisible by 4, the pass D is selected for dot formation in the target pixel. A target pixel shown by the hatched circle in FIG. 8 is the $7^{th}$ pixel on the raster (that is, on the $7^{th}$ column). The residue of the target pixel is '3' and the pass C is accordingly selected for dot formation in this target pixel.

Figure 9:
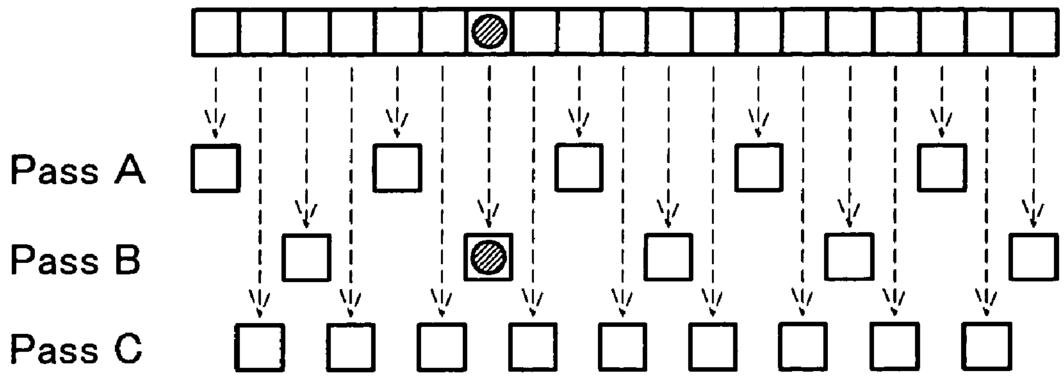
FIG. 9 shows another example of classification of pixels on one raster into multiple groups of print passes.

In the illustrated example of FIG. 8, different residues of target pixels lead to selection of different passes for dot formation in the respective target pixels. This is, however, not essential, and there may be many other systems for relating the residues to the passes. In another example of FIG. 9, pixels having the residue '1' are related to a pass A, pixels having the residue '3' are related to a pass B, and pixels having the residue '2' or '0' are related to a pass C. In this example, each raster is formed by three main scans corresponding to the passes A through C.

The number of main scans required to complete each raster is set in advance for each print mode. The user selects a desired print mode, for example, between a 'printing speed priority mode' and a 'picture quality priority mode' on the display of the CRT and sets the selected print mode in the computer 100, prior to actual image printing. In selection of the 'printing speed priority mode', the printer 200 completes each raster by only one main scan. In selection of the 'picture quality priority mode', the printer 200 completes each raster by multiple main scans (for example, four main scans). Available options of the print mode are not restricted to the 'printing quality priority mode' and the 'picture quality priority mode' but may include any other detailed modes. Various numbers of main scans (hereafter referred to as number of passes) may be allocated to the respective print modes. In the description below, it is assumed that a fixed number of passes is set to all rasters included in one image. In some print mode, however, the number of passes may be not fixed but varied in one image. An example of setting different numbers of passes to rasters included in one image will be discussed later.

Referring back to the flowchart of FIG. 7, after classification of the target pixel to the corresponding group, the determined dot on-off state of the target pixel is stored in the classified group in the RAM 106 (step S206). This storage process is described in detail with reference to FIGS. 8 and 10. As described above, in the example of FIG. 8, all the pixels on each raster are classified into the four groups, the passes A through D. The halftoning process of this embodiment stores the determination results representing the dot on-off state of the respective pixels in the classified groups on the RAM 106.

Figure 10:
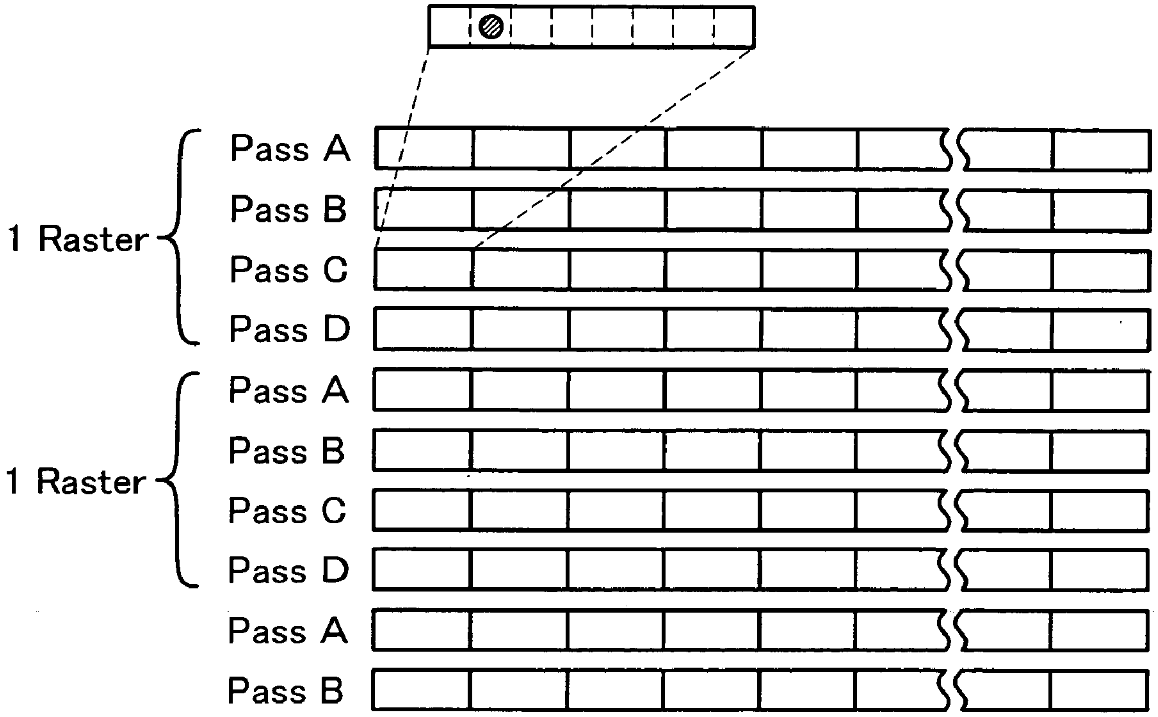
FIG. 10 shows one example of classified storage of determination results of dot on-off state in multiple groups of print passes.

FIG. 10 shows classified storage of the determination results of the dot on-off state on the RAM 106. The determination results with regard to pixels as objects of simultaneous dot formation by a first main scan are collectively stored in a predetermined data area on the RAM 106 (the top most area in the example of FIG. 10). Each raster is formed by four main scans in the sequence of the pass A, pass B, pass C, and pass D in this example. The determination results with regard to a preset number of pixels as objects of simultaneous dot formation by a first main scan, that is, the pass A, are collectively stored in a first data area on the RAM 106. In this description, the determination result of each pixel shows one of two states, that is, the dot-on state and the dot-off state and is accordingly expressible as 1-bit data. As shown in FIG. 10, the storage in each data area accordingly includes bit arrays.

A second data area immediately after the first data area for the pass A collectively stores the determination results with regard to the preset number of pixels as objects of simultaneous dot formation by a next main scan, that is, the pass B. In this manner, a third data area collectively stores the determination results with regard to the preset number of pixels as objects of simultaneous dot formation by a next main scan, that is, the pass C. A fourth data area collectively stores the determination results with regard to the preset number of pixels as objects of simultaneous dot formation by a next main scan, that is, the pass D. The RAM 106 accordingly has classified storage of the determination results of the dot on-off state of each raster in the multiple groups corresponding to the four passes A through D. For example, the target pixel shown by the hatched circle in FIG. 8 is the $2^{nd}$ pixel of the pass C. The determination result of this target pixel is accordingly stored in the $2^{nd}$ bit on the $3^{rd}$ row in FIG. 10, since the determination result of each pixel is expressed as 1-bit data. After classified storage of the determination results of one raster, the determination results of a next raster are stored in the classified groups corresponding to the passes A through D.

In the above description, all rasters included in one image are formed in the fixed sequence of the pass A, the pass B, the pass C, and the pass D. The sequence of passes for raster formation is, however, not restricted to this sequence. Rasters included in one image may be formed in different sequences of passes. Classified storage of the determination results of the dot on-off state in the multiple groups corresponding to the respective passes requires only a change of the reading sequence and is thus effective even in such cases.

The determination results are written in the RAM 106 according to the following procedure. The determination result of each pixel is expressed as 1-bit data but is written in the unit of 1 word, instead of the unit of 1 bit, in the RAM 106. The 'word' is a minimum unit allowing the computer to process data at a high efficiency. For example, an 8-bit computer is designed to read and write data in the units of 8 bits (=1 byte). One word accordingly consists of 8 bits. In a 16-bit computer, one word consists of 16 bits. In a 32-bit computer, one word consists of 32 bits. The computer 100 of this embodiment processes data in the units of 8 bits (=1 word). The determination result of each target pixel is thus written in the unit of 8 bits (=1 word) in the RAM 106.

Figure 11A:
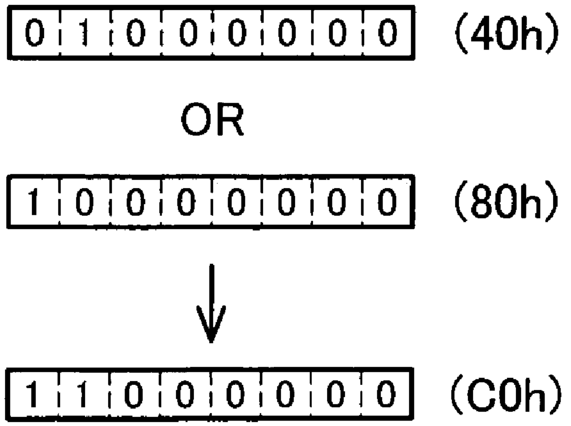
FIGS. 11A and 11B conceptually show determination results of a target pixel written in the units of 1 word.

FIG. 11 conceptually shows determination results of a target pixel written in the units of 1 word (=8 bits). The target pixel of FIG. 11 is identical with the pixel shown by the hatched circle in FIG. 8. Data '1' representing the dot-on state is written in the bit position of this target pixel (that is, the $2^{nd}$ bit) according to the procedure of FIG. 11A. In this example, the target bit of data writing is the $2^{nd}$ bit of a first word. The procedure first provides 8-bit data including '1' only in the $2^{nd}$ bit position and '0' in all the other bit positions (this is equivalent to 40 h in hexadecimal notation) and reads word data (first word data in this example) including the target bit of data writing from a corresponding data area on the RAM 106. The procedure then overwrites the original first word data in the RAM 106 with a result of an OR operation (logical sum) between the provided 8-bit data and the original first word data. The data '1' representing the dot-on state is accordingly written in the bit position of the target pixel.

Figure 11B:
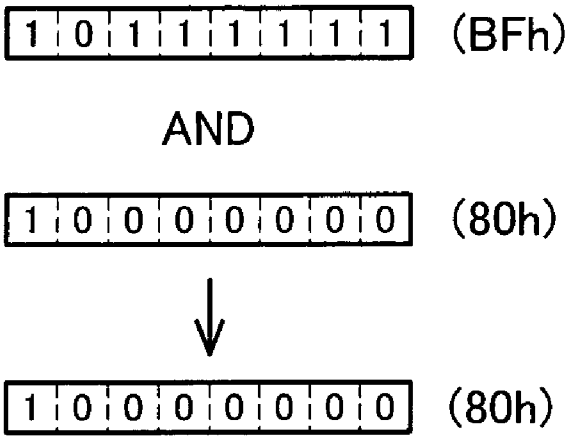

Data '0' representing the dot-off state is written in the bit position of the target pixel according to the procedure of FIG. 11B. The procedure first provides 8-bit data including '0' only in the $2^{nd}$ bit position and '1' in all the other bit positions (this is equivalent to BFh in hexadecimal notation) and reads the first word data from the corresponding data area on the RAM 106. The procedure then overwrites the original first data with a result of an AND operation (logical product) between the provided 8-bit data and the original first word data. In this manner, the determination results of the dot on-off state are stored in the units of 1 word. A set of data collectively stored in each classified group thus generally has a data volume of an integral multiple of one word.

At step S206 in the halftoning process of FIG. 7, the determination result of the target pixel is stored in the classified group of the corresponding pass on the RAM 106 according to the above procedure.

After writing the determination result of the current target pixel, the halftoning process determines whether all the pixels included in the image have been processed (step S208). When there is any unprocessed pixel (step S208: No), the halftoning process returns to step S200 to select a next target pixel, typically an adjacent pixel to the prior target pixel, and to subsequent steps. When all the pixels included in the image have been processed (step S208: Yes), the program exits from the halftoning process of FIG. 7 and goes back to the image processing routine of FIG. 6.

In the above description, each data area in the RAM 106 has collective storage of the determination results of the dot on-off state with regard to a preset number of pixels as objects of simultaneous dot formation by one main scan. This system is, however, not essential, but a different system may be applied to classified storage of the determination results in multiple groups corresponding to the respective passes. In an example of FIG. 12, the determination results of the respective pixels may be collectively stored in the units of one word (=8 bits=1 byte in this embodiment) or in the units of several words.

E. Data Output Process

Figure 13:
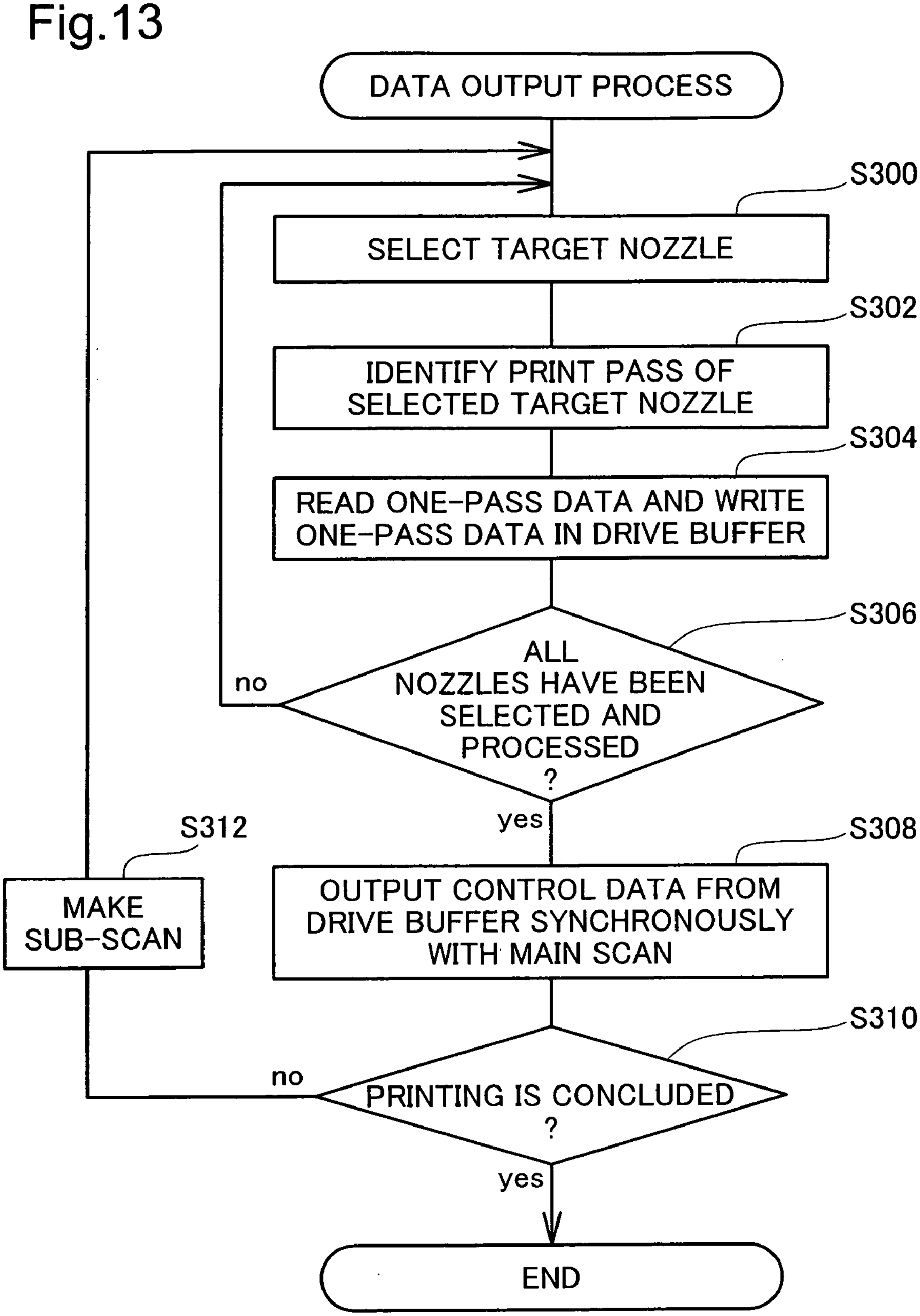
FIG. 13 is a flowchart showing the details of a data output process in the image processing routine of the embodiment.

Referring back to the flowchart of FIG. 6, after completion of the halftoning process at step S106, the image processing routine starts a data output process at step S108. The data output process reads the determination results stored in the classified groups on the RAM 106 by the halftoning process and outputs the determination results to the drive buffer 261 of the printer 200. FIG. 13 is a flowchart showing the details of the data output process.

The data output process first selects a target nozzle of dot formation (step S300). As described above with reference to FIGS. 4 and 5, multiple nozzles are formed in the bottom of each ink ejection head, and the drive buffer 261 is connected to the source of the non-illustrated piezoelectric element of each nozzle. A target nozzle for dot formation is selected at step S300, prior to output of the data of determination results read from the RAM 106 to the drive buffer 261.

The data output process then identifies a print pass of the selected target nozzle (step S302). The printer 200 completes each raster by four main scans, the passes A through D. The processing of step S302 thus identifies the print pass or the main scan for dot formation allocated to the selected target nozzle.

Figure 12:
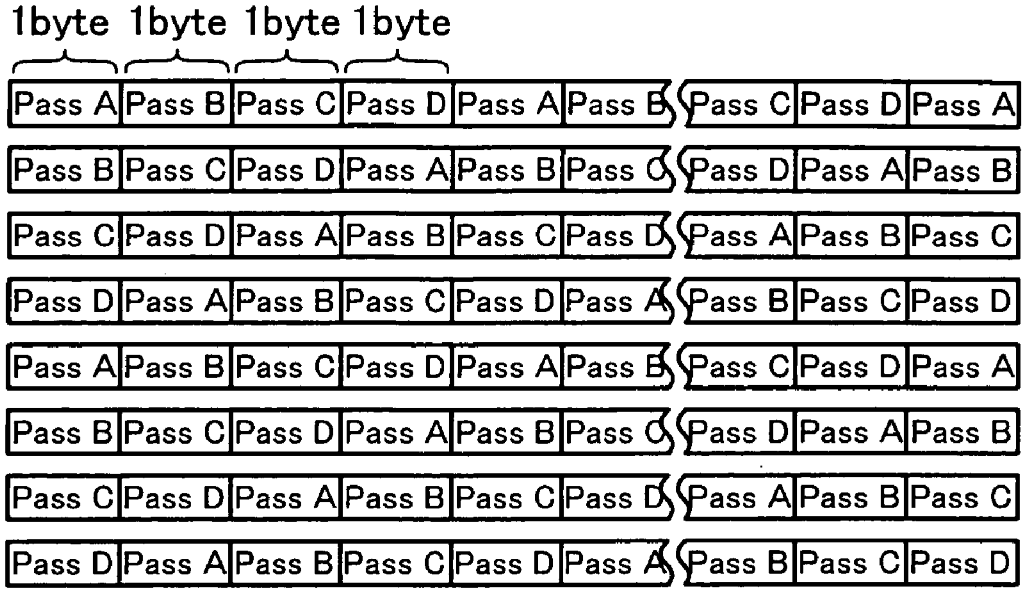
FIG. 12 shows another example of classified storage of determination results of dot on-off state in multiple groups of print passes.

The data output process subsequently reads data regarding the preset number of pixels as objects of simultaneous dot formation by one main scan (one-pass data) among the classified storage of the determination results of the dot on-off state in the RAM 106 and writes the one-pass data at a position of the drive buffer 261 corresponding to the selected target nozzle (step S304). As shown in FIG. 10 or FIG. 12, the determination results of the dot on-off state are stored in multiple groups classified according to allocation of the passes A through D to dot formation in the respective pixels on each raster. This classified storage technique enables the data of the target nozzle to be read from the RAM 106 and written in the drive buffer 261 at a sufficiently high speed.

The data output process then determines whether data of all the nozzles included in the ink ejection heads 244 through 247 have been written in the drive buffer 261 (step S306). When there is any unselected nozzle as the target nozzle (step S306: No), the data output process returns to step S300 to select a next target nozzle and to subsequent steps. When data of all the nozzles have been written in the drive buffer 261 (step S306: Yes), on the other hand, the printer 200 outputs the data written in the drive buffer 261 to a driving circuit of the piezoelectric element of each nozzle as control data, synchronously with one main scan of the print head 241 (step S308). The D/A converter 262 outputs a driving signal of the synch circuit, synchronously with the main scan of the print head 241. Ink droplets are thus ejected from the respective nozzles according to the output control data to create dots at adequate positions in the main scanning direction on the printing paper.

On completion of one main scan with dot formation, the data output process determines whether printing of an image is concluded (step S310). When printing of the image is not yet concluded (step S310: No), the data output process makes a sub-scan by a preset amount (step S312) and returns to step S300 to select a target nozzle for a next print pass and to subsequent steps. This series of processing is repeated until conclusion of printing (step S310: Yes).

In the image processing routine of this embodiment as described above, the halftoning process attains classified storage of the determination results of the dot on-off state according to allocation of the print passes to dot formation in the respective pixels on one raster in the RAM 106. This classified storage technique enables the one-pass data of each target nozzle to be read from the RAM 106 and written in the drive buffer 261 at a sufficiently high speed, thus effectively shortening the total printing time. The set of data collectively stored in each classified group on the RAM 106 has the data volume of one word or an integral multiple of one word. As mentioned above, the computer is designed to attain the high-speed data processing in the units of 1 word. Collective data storage by this specified data volume further accelerates the process of reading data from the RAM 106 and writing the data in the drive buffer 261.

Figure 14:
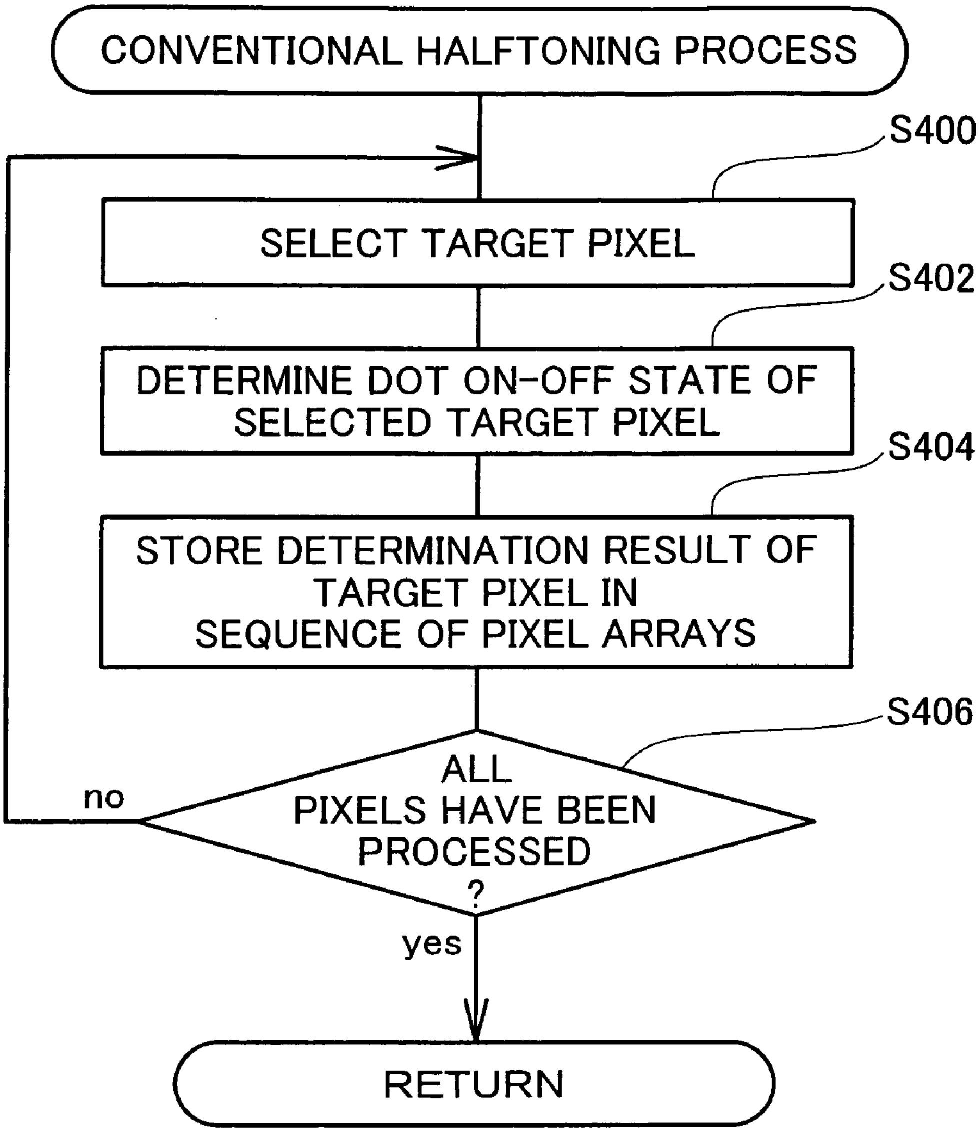
FIG. 14 is a flowchart showing a conventional halftoning process as a reference.

For the better understanding of the effect of the embodiment to shorten the total printing time, conventional halftoning process and data output process are described briefly. FIG. 14 is a flowchart showing the conventional halftoning process as a reference. The conventional halftoning process first selects a target pixel (step S400) and determines the dot on-off state of the selected target pixel (step S402). Any of diverse known techniques, for example, the error diffusion technique and the dither technique, may be adopted to determine the dot on-off state of the target pixel. The conventional halftoning process then stores the determination result of the selected target pixel in the sequence of pixel arrays of a resulting image (step S404). This series of processing is repeated to process all the pixels (step S406).

Figure 15:
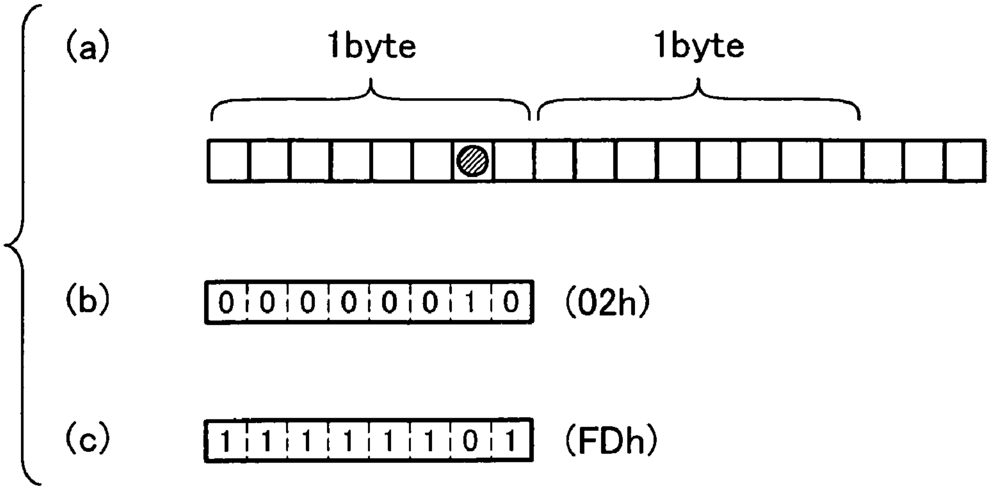
FIG. 15 shows a determination result of a target pixel stored by the conventional halftoning process.

FIG. 15 conceptually shows a determination result of a target pixel written on the RAM by the conventional halftoning process. A hatched circle in FIG. 15(*a*) represents a target pixel. When one raster is divided from the head by the units of byte as shown in FIG. 15(*a*), the target pixel corresponds to a $7^{th}$ pixel in a first byte. When the determination result of this target pixel represents the dot-on state, the conventional halftoning process provides 1-word (8-bit) data shown in FIG. 15(*b*). The 1-word data has '1' in only the $7^{th}$ bit corresponding to the position of the target pixel and '0' in all the other bits.

The conventional halftoning process then reads 1-word data from a specified place on the RAM for storage of the determination result of the target pixel and overwrites the original 1-word data in the specified place on the RAM with a result of an OR operation (logical sum) between the data of FIG. 15(*b*) and the original 1-word data. When the determination result of the target pixel represents the dot-off state, on the other hand, the conventional halftoning process provides 1-word data shown in FIG. 15(*c*). The conventional halftoning process then overwrites the original 1-word data in the specified place on the RAM with a result of an AND operation (logical product) between the data of FIG. 15(*c*) and the original 1-word data.

The halftoning process of the embodiment shown in the flowchart of FIG. 7 stores the determination results of the respective target pixels classified in multiple groups and naturally requires a longer processing time for the classified storage, compared with the conventional halftoning process shown in the flowchart of FIG. 14. The time required for the classified storage is, however, relatively shorter than the time required for determination of the dot on-off state of each target pixel and the time required for providing data representing the determination result and performing a logical operation. The processing time of the halftoning process of the embodiment is thus substantially equal to the processing time of the conventional halftoning process.

The halftoning process of the embodiment stores the determination results of the dot on-off state classified in the multiple groups according to allocation of the passes to dot formation in the respective target pixels, as described above. This classified storage technique effectively simplifies and facilitates the subsequent data output process to output the data read from the classified storage on the RAM to the respective nozzles of the print head. The conventional halftoning process, on the other hand, stores the determination results of the dot on-off state in the sequence of pixel arrays of the image. This storage technique requires a relatively complicated data output process to output the stored data on the RAM to the respective nozzles of the print head. The conventional data output process is described below with reference to FIG. 16.

Figure 16:
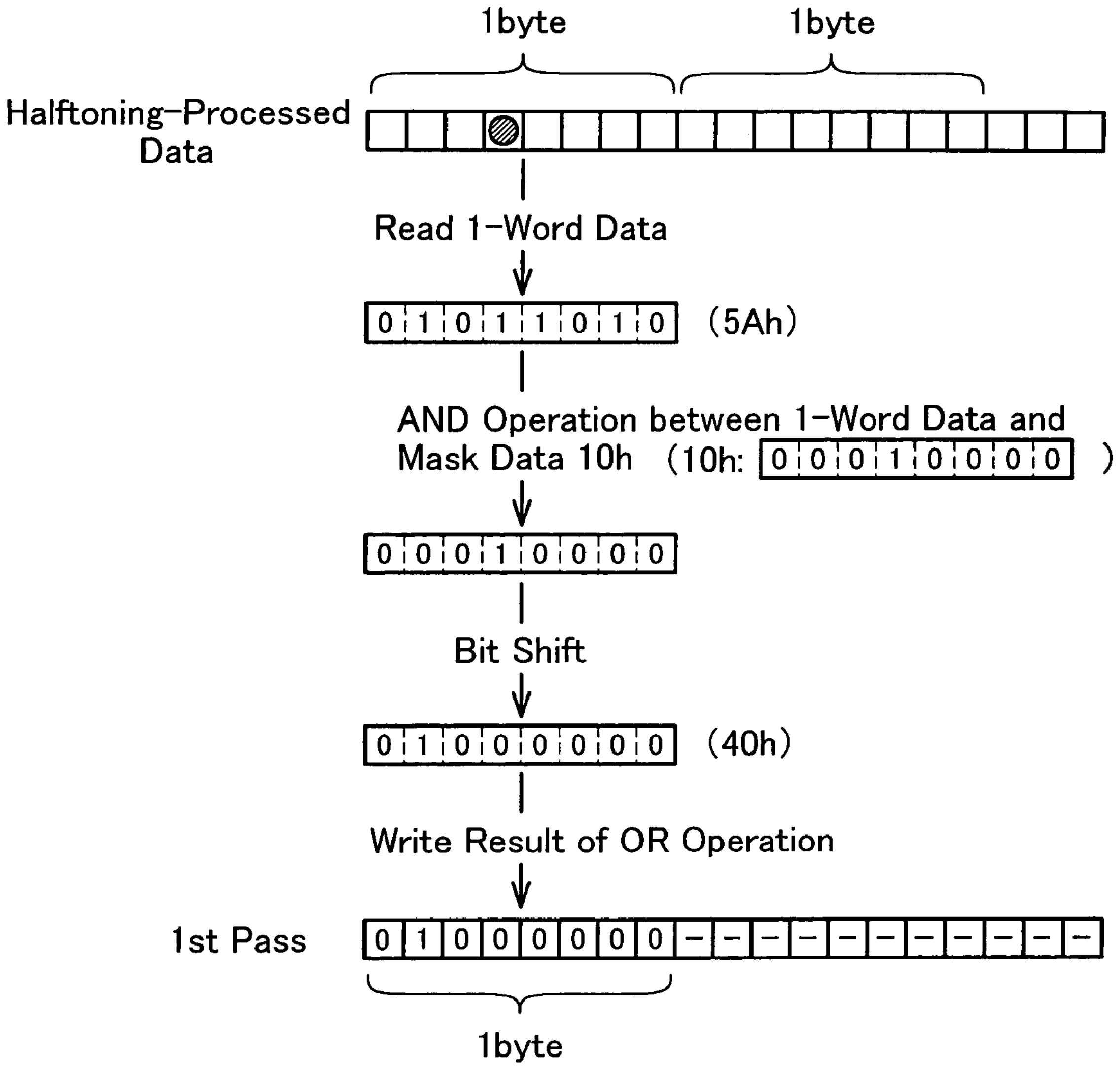
FIG. 16 shows a process of reading the determination result stored by the conventional halftoning process and writing the determination result in a drive buffer.

FIG. 16 conceptually shows a conventional process of reading raster data from the storage and writing the raster data in the drive buffer when the determination results of the dot on-off state have been stored on the RAM in the sequence of pixel arrays of the image. An alignment of multiple squares on the top of FIG. 16 represents storage of raster data on the RAM. The process of FIG. 16 writes data of a target pixel shown by the hatched circle among the raster data in the drive buffer.

Data are read from and written in the RAM in the units of 1 word as mentioned above. The data output process first reads 1-word data including the target pixel among the halftoning-processed data. In the illustrated example of FIG. 16, the read 1-word data is 5A in hexadecimal notation. In the description below, a suffix 'h' denotes hexadecimal notation.

Only data in a $4^{th}$ bit of the read 1-word data represents the determination result of the target pixel, while data in all the other bits of the 1-word data regard other pixels. The conventional data output process provides mask data corresponding to the pixel position of the target pixel and performs an AND operation (logical product) between the read 1-word data (5Ah in hexadecimal notation) and the provided mask data. The mask data has '1' in only a $4^{th}$ bit corresponding to the data storage position of the target pixel in the 1-word data and '0' in all the other bits (10h in hexadecimal notation). The AND operation between the read 1-word data and the mask data enables extraction of only the determination result of the target pixel from the read on-word data (5Ah).

After extraction of the determination result of the target pixel, the conventional data output process performs a bit shift and generates data to be written in the drive buffer as described below. In the illustrated example of FIG. 16, the target pixel is the $4^{th}$ pixel on the raster, and one raster is completed by three main scans. The target pixel is accordingly a $2^{nd}$ pixel in a $1^{st}$ pass. The bit shift of the extracted data of the target pixel generates write data that has '1' only in the $2^{nd}$ bit and '0' in all the other bits (40h in hexadecimal notation). The write data is written in a specified data area on the RAM reserved for storage of data of the $1^{st}$ pass. The procedure reads 1-word data from the specified data area and overwrites the original 1-word data in the specified data area with a result of an OR operation (logical sum) between the generated write data (40h) and the original 1-word data. Instead of individually writing the data of each target pixel in the RAM, another known technique may be adopted to temporarily store the data of multiple target pixels corresponding to one word in an intermediate buffer and collectively write the one-word data of the multiple target pixels in the RAM.

As described above, the conventional data output process extracts the data of each target pixel among the determination results stored on the RAM in the sequence of pixel arrays of the image and writes the extracted data of the target pixel in a separate data area on the RAM. This series of processing is executed for all the pixels on rasters included in an object image to be printed. The determination results stored on the RAM in the sequence of pixel arrays of the image are then rearranged in the order of actual dot formation by the respective nozzles and are transferred to the separate data area on the RAM. The rearranged data representing the determination results are written in the drive buffer of the printer and are output from the drive buffer to the respective nozzles synchronously with each main scan of the print head to create dots on the printing paper.

The conventional data output process requires at least three operations to rearrange the determination results stored in the sequence of pixel arrays of the image. The required three operations are the AND operation (logical product) for reading data of each target pixel, the bit shift for generating the write data, and the OR operation (logical sum) for writing the write data. These three operations should be performed for all the pixels included in the image. The process of rearranging data read from the RAM and outputting the rearranged data to the corresponding nozzles thus consumes an undesirably long time.

The halftoning process of the embodiment, on the other hand, stores the determination results of the dot on-off state classified in the multiple groups according to allocation of the passes to dot formation in the respective target pixels. The data output process of the embodiment thus collectively reads each set of data stored in each classified group on the RAM 106 and writes the set of data in the drive buffer 261 for dot formation. This arrangement ensures the high-speed data output. The set of data has the data volume of one word or an integral multiple of one word, which allows for high-speed data processing by the computer. This also enables the data on the RAM 106 to be read out and written in the drive buffer 261 at a high speed. The data output process of the embodiment shown in FIG. 12 thus remarkably saves the processing time, compared with the conventional data output process described above with reference to FIG. 16.

F. Modifications The image processing of the above embodiment may be modified in various ways. Some examples of possible modification are described briefly.

(1) FIRST MODIFIED EXAMPLE

The printer of the embodiment can take one of the two states, that is, the dot-on state or the dot-off state, in each pixel. Some known printers may, however, have a greater number of different states selectable for each pixel, for example, by varying the dot size or the dot density or by creating multiple dots in each pixel. The technique of the invention is also preferably applicable to such printers. For example, in a variable dot printer that varies the dot size in three stages, a small size, a medium size, and a large size, there are four different states of dot formation, 'no dot formation', 'formation of small-size dot', 'formation of medium-size dot', and 'formation of large-size dot'. The determination result of each pixel given by the halftoning process is accordingly expressed as 2-bit data (4 tones) to represent one of these four different states.

Figure 17:
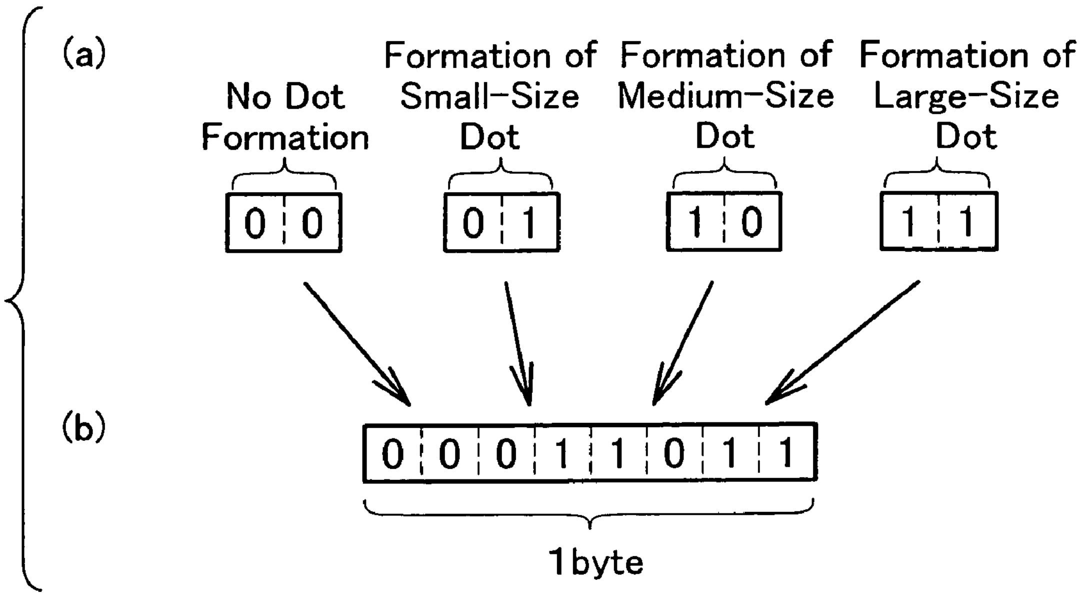
FIG. 17 shows four different states of dot formation in each target pixel expressed as 2-bit data in a first modified example.

FIG. 17 shows four different states of dot formation expressed as 2-bit data. As shown in FIG. 17(*a*), data '00' with '0' in both bits represents the state of 'no dot formation', and data '11' with '1' in both bits represents the state of 'formation of large-size dot'. Data '01' with '1' in only the lower bit represents 'formation of small-size dot', and data '10' with '1' only in the upper bit represents 'formation of medium-size dot'. The 2-bit data can express the four different states of dot formation in this manner. Multiple 2-bit data representing the determination results of multiple pixels are collectively stored as 1-word data in the RAM 106. In this example, 1-word data is equivalent to 1-byte data and thus includes the determination results of four pixels as shown in FIG. 17(*b*).

Figure 18A:
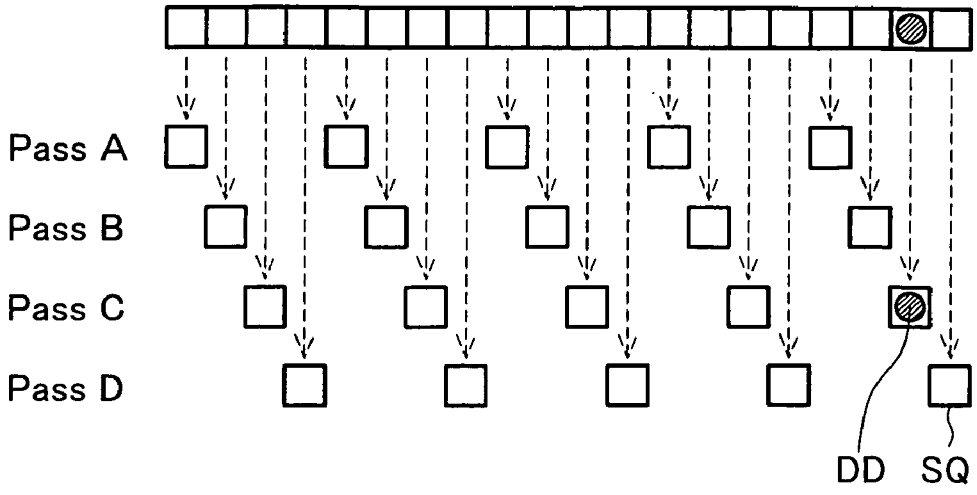
FIGS. 18A and 18B show storage of a determination result of a target pixel expressed as 2-bit data in the first modified example.
Figure 18B:
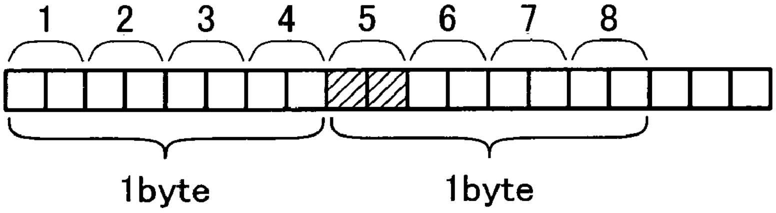

The following describes the details of the process of storing the determination result of each pixel expressed as 2-bit data in the RAM 106. FIGS. 18A and 18B show storage of the determination result of a target pixel on a raster. Small squares SQ of FIG. 18A represent pixels constituting a raster, and a square filled with a hatched circle DD represents a target pixel. In this illustrated example, the number of passes is equal to 4. Namely each raster is completed by four main scans. The target pixel of FIG. 18A is accordingly a $5^{th}$ pixel in a pass C. The determination result of each pixel given by the halftoning process is expressed as 2-bit data as shown in FIG. 17. The determination result of the $5^{th}$ pixel in the pass C is accordingly stored in first two bits of a $2^{nd}$ byte as shown by hatched squares in FIG. 18B. For example, when the 2-bit data of the target pixel represents 'no dot formation', data '00' is written in the first two bits of the $2^{nd}$ byte shown by the hatched squares in FIG. 18B. In another example, when the 2-bit data of the target pixel represents 'formation of medium-size dot', data '10' is written in the first two bits of the $2^{nd}$ byte.

When the determination result of each pixel is expressed as 2-bit data, the data output process reads data in the units of 2 bits from the RAM and outputs the data to corresponding nozzles. This principle is applicable to printers with variable density dots and to printers with varying number of dots in each pixel. In a printer having 5 to 8 tones selectable for each pixel, the determination result of each pixel is expressible as 3-bit data. In general, in a printer having N tones (where N denotes an integer of or over 2) selectable for each pixel, the determination result of each pixel is expressible by m-bit data, where m satisfies:

$$2^{m-1} < N \leqq 2^m$$

(2) SECOND MODIFIED EXAMPLE

In the above embodiment and the first modified example, the number of passes is fixed to an identical value in one image. One image may be printed with a change in number of passes. The principle of the invention is also preferably applicable to this printing system as described below as a second modified example.

Figure 19A:
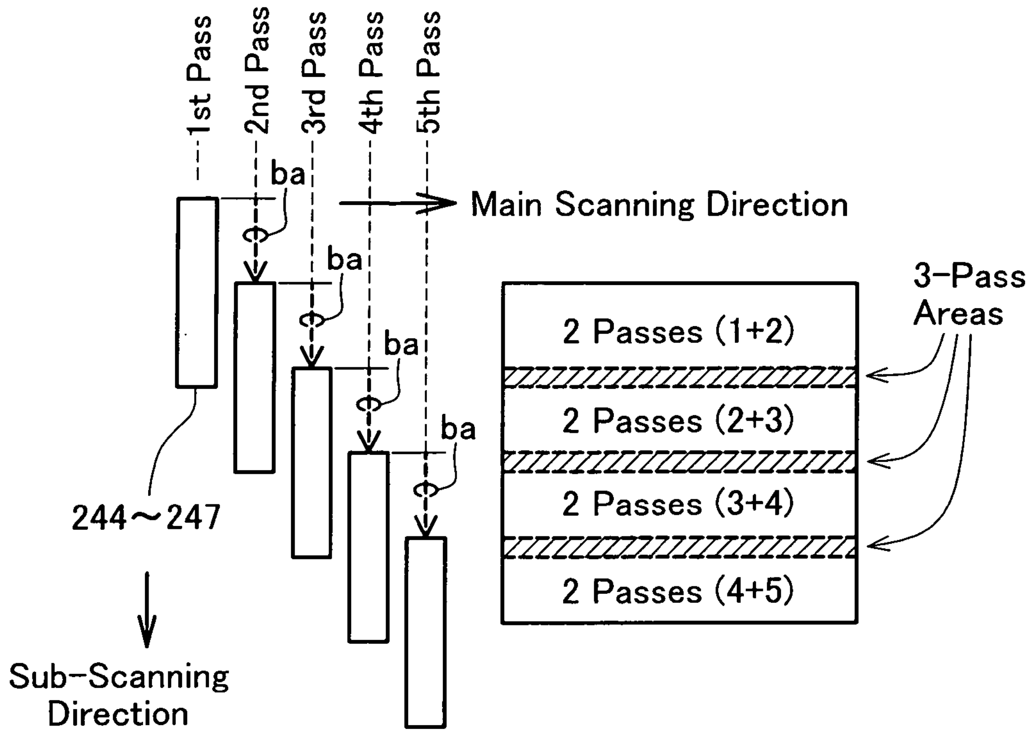
FIGS. 19A and 19B conceptually show a process of printing an image with a change in number of passes as a second modified example.
Figure 19B:
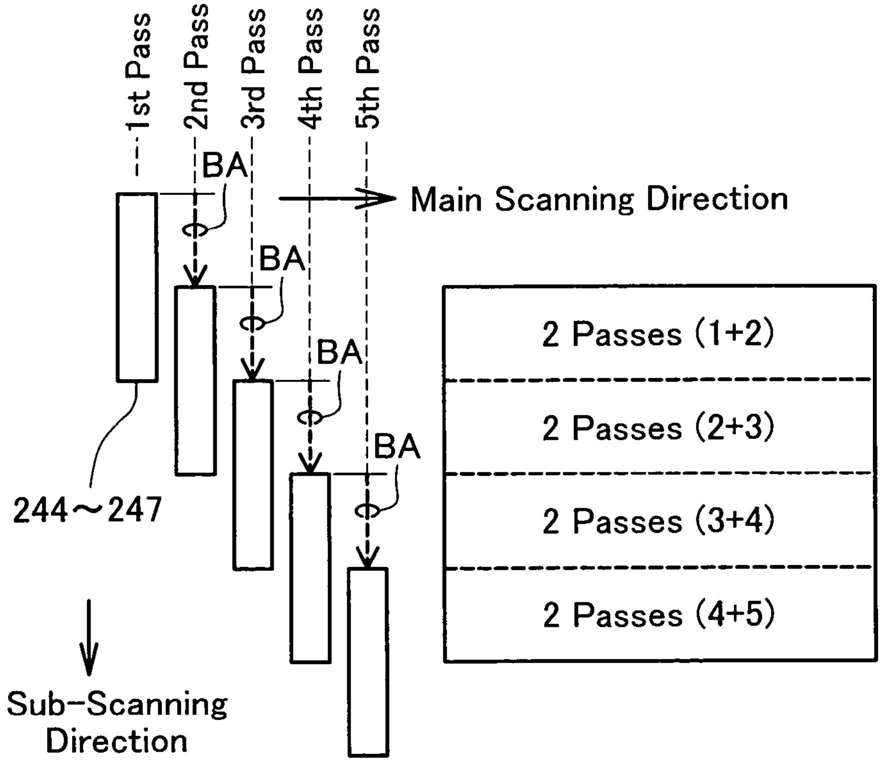

FIGS. 19A and 19B conceptually show a process of printing an image with a change in number of passes. In an illustrated example of FIG. 19A, rasters of one image are printed with a change in number of passes between ‘2’ and ‘3’. In a comparative example of FIG. 19B, all rasters of one image are printed with a fixed number of passes ‘2’. For the better understanding of explanation, the description first regards the comparative example of FIG. 19B where every raster in an image is formed by two passes.

The printer 200 creates dots on printing paper in each main scan of the ink ejection heads 244 through 247 to form rasters and subsequently makes a sub-scan by a preset amount to shift the relative position of the ink ejection heads 244 through 247 to the printing paper. In this manner, a number of rasters are formed to complete a printed image. The left half of FIG. 19B conceptually shows sub-scans of the ink ejection heads 244 through 247 by a preset amount ‘BA’. The right half of FIG. 19B conceptually shows formation of multiple rasters on the printing paper by main scans at the respective sub-scanned positions. The printer 200 of the embodiment has the four ink ejection heads 244 through 247 for the respective color inks as described above. For the simplicity of illustration, however, these four ink ejection heads 244 through 247 are represented by one rectangle in FIGS. 19A and 19B. In the description below, these four ink ejection heads 244 through 247 is simply referred to as the print head.

When every raster in an image is formed by two passes, the printer creates dots in a first main scan of the print head, makes a sub-scan by half the length of the print head, and makes a second main scan at this sub-scanned position to create dots as shown in FIG. 19B. The printer then makes another sub-scan by the same length and makes a third main scan. Each arrow of the broken line in FIG. 19B represents a sub-scan of the print head by the preset amount ‘BA’. Each sub-scan shifts the position of the print head in the sub-scanning direction by half the length of the print head. Namely the print head makes two main scans over an identical area. Every raster in the image is thus completed by two passes.

Formation of each raster is described with reference to the right half of FIG. 19B. The print head passes through a top area of an image in a $1^{st}$ main scan and a $2^{nd}$ main scan, that is, by a $1^{st}$ pass and a $2^{nd}$ pass. Rasters in this top area are accordingly formed by the two passes, the $1^{st}$ pass and the $2^{nd}$ pass. In the illustration of FIG. 19B, the expression ‘2 passes (1+2)’ means that rasters in this area are formed by the two passes, the $1^{st}$ pass and the $2^{nd}$ pass. The print head passes through a second top area of the image in the $2^{nd}$ main scan and a $3^{rd}$ main scan, that is, by the $2^{nd}$ pass and a $3^{rd}$ pass. Rasters in this second top area are accordingly formed by the two passes, the $2^{nd}$ pass and the $3^{rd}$ pass. Similarly rasters in a third top area are formed by two passes, the $3^{rd}$ pass and a $4^{th}$ pass, and rasters in a fourth top area are formed by two passes, the $4^{th}$ pass and a $5^{th}$ pass. In this manner, all the rasters included in the image are formed with the fixed number of passes ‘2’.

In the example of FIG. 19A, rasters of one image are formed with a change in number of passes. Similarly to the example of FIG. 19B, the print head makes a sub-scan by a preset amount ‘ba’ after each main scan in the example of FIG. 19A. The preset amount ‘ba’ of sub-scan in the example of FIG. 19A is slightly smaller than the preset amount ‘BA’ of sub-scan that is equal to half the length of the print head in the example of FIG. 19B. This setting of FIG. 19A enables alternate appearance of 2-pass areas and 3-pass areas in one image. In the example of FIG. 19B, two sub-scans shift the print head in the sub-scanning direction by the length of the print head. In the example of FIG. 19A, on the other hand, the preset amount of sub-scan is smaller than half the length of the print head, so that two sub-scans shift the print head in the sub-scanning direction by a distance less than the length of the print head. The main-scanned areas by the respective ends of the print head accordingly have some overlaps. In the example of FIG. 19A, the main-scanned area by one end of the print head in the $3^{rd}$ pass has an overlap with the main-scanned area by the opposite end of the print head in the $1^{st}$ pass. Similarly the main scanned-area by one end of the print head in the $4^{th}$ pass has an overlap with the main-scanned area by the opposite end of the print head in the $2^{nd}$ pass. The main scanned-area by one end of the print head in the $5^{th}$ pass has an overlap with the main-scanned area by the opposite end of the print head in the $3^{rd}$ pass. Namely the number of passes in the main-scanned areas by the respective ends of the print head on the image is greater than the number of passes in the main-scanned areas by the center portion of the print head.

The production characteristics of the print head often cause the lower accuracy of nozzles on the ends of the print head. The main-scanned areas by the ends of the print head accordingly have a relatively high potential for the poorer picture quality. Setting the amount of sub-scan to an adequate value makes the number of passes in the main-scanned areas by the ends of the print head greater than the number of passes in the main-scanned areas by the center portion of the print head. Such setting enables only the potentially poorer-picture quality areas to be printed by the greater number of passes. This arrangement desirably assures a high-quality printed image, while minimizing a decrease in printing speed.

Figure 20:
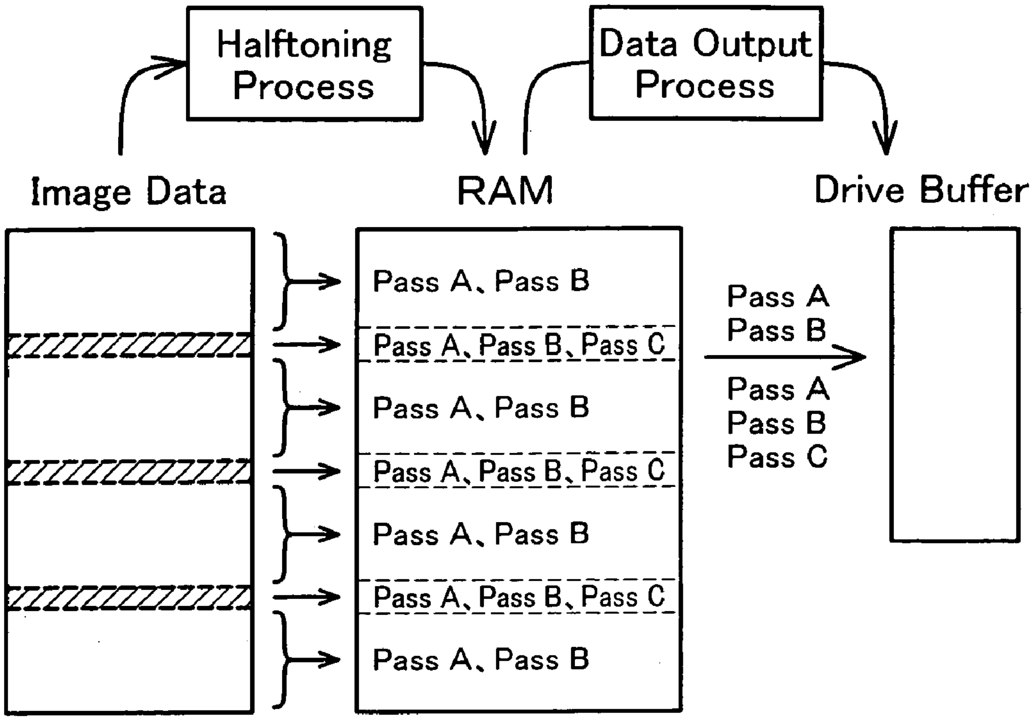
FIG. 20 conceptually shows one procedure of writing halftoning-processed image data in a drive buffer in the second modified example.

Application of the technique of the invention to the printing system of printing an image with a change in number of passes is described below as the second modified example. FIG. 20 conceptually shows one procedure of the halftoning process and the data output process to write processed image data in a drive buffer in the second modified example. A rectangle on the left side of FIG. 20 represents image data of an object image to be printed. In this illustrated example, one image includes 2-pass areas and 3-pass areas as described above based on FIG. 19A. The length of the print head is naturally fixed. Setting the sub-scan amount of the print head thus automatically determines the 3-pass areas. In the illustration of FIG. 20, hatched portions represent the 3-pass areas.

The halftoning process determines the dot on-off state of the respective pixels according to the image data and stores the determination results in the RAM 106. In each of the 2-pass areas, the determination results are divided into 2 groups corresponding to passes A and B. In each of the 3-pass areas, the determination results are divided into 3 groups corresponding to passes A, B, and C. A rectangle on the center of FIG. 20 represents the RAM 106 for storing the determination results of the dot on-off state. As illustrated, the determination results of each 2-pass area in the image are classified into 2 groups corresponding to the passes A and B and are stored in the RAM 106. The determination results of each hatched 3-pass area in the image are classified into 3 groups corresponding to the passes A, B, and C and are stored in the RAM 106.

The subsequent data output process reads data representing the classified determination results from the RAM 106 and writes the data into the drive buffer. The data for one main scan accumulated in the drive buffer are output to the corresponding nozzles synchronously with a main scan of the print head to create dots on the printing paper. The data representing the determination results of the dot on-off state with regard to pixels scanned for dot formation by a subsequent main scan should be written in the drive buffer in the classified manner for the multiple nozzles on the print head. The procedure of the second embodiment gives classified storage of the determination results in 2 groups corresponding to the passes A and B for the 2-pass areas, while giving classified storage of the determination results in 3 groups corresponding to the passes A through C for the 3-pass areas. This arrangement enables data representing the classified determination results to be read out of the RAM 106 and written in the drive buffer at a sufficiently high speed.

Figure 21:
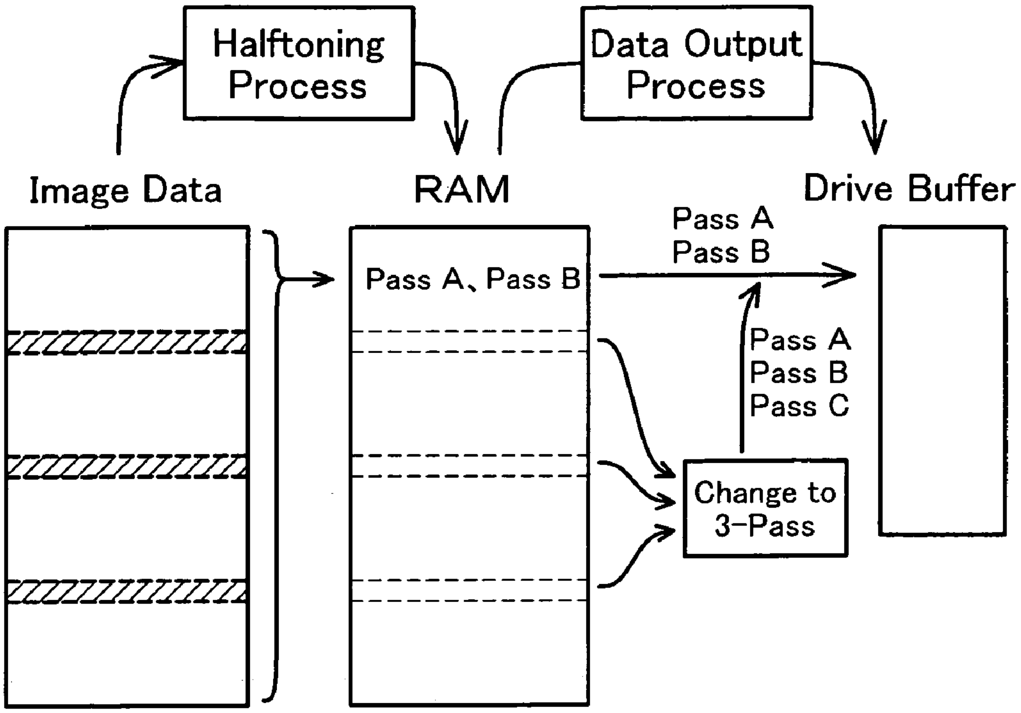
FIG. 21 conceptually shows another procedure of writing halftoning-processed image data in a drive buffer in the second modified example.

Another possible procedure of the second modified example unconditionally classifies the determination results of the dot on-off state by the halftoning process into 2 groups corresponding to passes A and B and stores the determination results in the 2 groups in the RAM 106 as shown in FIG. 21. The subsequent data output process reads data for the 2-pass areas from the classified storage of the determination results in the RAM 106 and writes the data in the drive buffer. The classified storage of the determination results for the 3-pass areas in the RAM 106, however, does not correspond to each main scan of nozzles for raster formation. The data output process then selects data of the 3-pass areas with regard to pixels as objects of dot formation by a subsequent main scan from the classified storage of the determination results in the groups of the passes A and B and writes the selected data in the drive buffer. The data for one main scan accumulated in the drive buffer are output to the corresponding nozzles synchronously with a main scan of the print head to create dots on the printing paper.

In this system of the second modified example, the classified storage of the determination results for the 3-pass areas in the RAM 106 does not correspond to each main scan of nozzles for raster formation. The procedure thus requires to select data of the 3-pass areas with regard to pixels as objects of dot formation by a subsequent main scan from the classified storage in the RAM 106 and to write the selected data in the drive buffer. The selection naturally consumes some time. The 3-pass areas included in one image, however, generally occupy a smaller portion than the 2-pass areas. The classified storage of the determination results for the 2-pass areas corresponds to each main scan of nozzles for raster formation. This arrangement thus still effectively shortens the total processing time required for reading the data representing the determination results of the dot on-off state from the classified storage in the RAM 106 and writing the data in the drive buffer.

The illustrated example of FIG. 21 requires selection of data of the 3-pass areas with regard to pixels as objects of dot formation by a subsequent main scan from the storage in the RAM 106. The halftoning-processed data for the 3-pass areas may not be classified into multiple groups but may be stored in the sequence of pixel arrays on the image.

As described above, this second procedure of the second modified example extracts data of specified image areas with regard to pixels as objects of dot formation by a subsequent main scan from the storage in the RAM 106. This arrangement is relatively readily applicable to a printing system of printing an image with a complicated change in number of passes.

The embodiment and the modified examples discussed above are to be considered in all aspects as illustrative and not restrictive. There may be many other modifications, changes, and alterations without departing from the scope or spirit of the main characteristics of the present invention. For example, the technique of the invention is applicable to monochrome printers, as well as to the color printers.

The computer system may execute software programs (application programs) supplied to its internal main memory or an external storage device via a communication line to attain the functions of the image processing device. The computer system may otherwise read and execute the software programs stored in a CD-ROM or a flexible disk.

INDUSTRIAL APPLICABILITY

The technique of the invention is actualized by the computer-based image data conversion process and the image processing device as described above in the embodiment and the modified examples. Part or all of the image data conversion process may be executed by a printer or an exclusive image processing device. The technique of the invention is not restricted to printers but is also applicable to diversity of other similar devices, such as facsimiles, scanner-printer complex machines, and copying machines.

What is claimed is:

1. A printing device that prints an image on a printing medium, said printing device comprising:

- a raster formation assembly that is scanned in a raster-forming direction relative to the printing medium and completes each raster or each dot line on the printing medium by a preset number of multiple scans;
- a shift module that shifts the raster formation assembly in a perpendicular direction orthogonal to the raster-forming direction relative to the printing medium after every scan of the raster formation assembly in the raster-forming direction for raster formation;
- an image data receiving module that receives object image data representing an object image to be printed;
- a dot on-off state determination module that determines dot on-off state with regard to a number of pixels constituting the object image, based on the received image data;
- a determination result storage module that classifies determination results representing dot on-off state of plural pixels on each raster into multiple groups according to allocation of the preset number of multiple scans to raster formation in the plural pixels on the raster and stores the determination results classified in the multiple groups; and
- a determination result supply module that reads the determination results of each classified group from the classified storage of said determination result storage module synchronously with each scan of the raster formation assembly in the raster-forming direction, and supplies the read determination results of each classified group to the raster formation assembly, which then creates dots in dot-on pixels to complete each raster on the printing medium according to the supplied determination results of each classified group.

2. A printing device in accordance with claim 1, wherein said determination result storage module sets a unit of each classified group to an integral multiple of a standard data volume adopted for data transmission in said printing device, and classifies and stores the determination results representing the dot on-off state of the plural pixels on each raster into the multiple groups of the set units.

3. A print control device that supplies control data to a printing unit to print an image, where said printing unit has a raster formation assembly that is scanned in a raster-forming direction relative to a printing medium and completes each raster or each dot line on the printing medium by a preset number of multiple scans, said print control device comprising:

an image data receiving module that receives object image data representing an object image to be printed;

a dot on-off state determination module that determines dot on-off state with regard to a number of pixels constituting the object image, based on the received image data;

a determination result storage module that classifies determination results representing dot on-off state of plural pixels on each raster into multiple groups according to allocation of the preset number of multiple scans to raster formation in the plural pixels on the raster and stores the determination results classified in the multiple groups; and a control data supply module that reads the determination results of each classified group from the classified storage of said determination result storage module synchronously with each scan of the raster formation assembly in the raster-forming direction, and supplies the read determination results of each classified group to said printing unit as the control data for controlling dot formation by the raster formation assembly.

4. A print control device in accordance with claim 3, wherein said determination result storage module sets a unit of each classified group to an integral multiple of a standard data volume adopted for data transmission in said print control device, and classifies and stores the determination results representing the dot on-off state of the plural pixels on each raster into the multiple groups of the set units.

5. A print control device in accordance with claim 3, wherein said determination result storage module sets a unit of each classified group to a predetermined number of multiple pixels as objects of simultaneous dot formation by one scan of the raster formation assembly in the raster-forming direction, and classifies and stores the determination results representing the dot on-off state of the plural pixels on each raster into the multiple groups of the set units.

6. A print control device in accordance with any one of claims 3 through 5, wherein said determination result storage module classifies and stores the determination results of the dot on-off state of the plural pixels on each raster into the multiple groups, based on pixel numbers or ordinal numbers assigned to the plural pixels on the raster from a head of the raster.

7. A print control device in accordance with claim 6, wherein said determination result storage module classifies and stores the determination results of the dot on-off state of the plural pixels on each raster into the multiple groups, based on residues obtained by dividing the pixel numbers by the preset number of multiple scans for raster formation.

8. A print control device in accordance with claim 3, wherein said printing unit changes the number of multiple scans for raster formation to print the object image, while shifting the raster formation assembly in a perpendicular direction orthogonal to the raster-forming direction relative to the printing medium after every scan of the raster formation assembly in the raster-forming direction for raster formation, said printing unit comprising a major raster selection module that selects major rasters among a number of rasters constituting the image, where each of the major rasters is formed by a major number of multiple scans out of plurality of the changing numbers of multiple scans for raster formation to complete the printed image, and said determination result storage module classifying and storing the determination results with regard to plural pixels on each major raster into multiple groups corresponding to the major number of multiple scans in the raster-forming direction for formation of each major raster.

9. A print control device in accordance with claim 8, wherein said determination result storage module classifies and stores the determination results with regard to plural pixels on each of residual rasters into multiple groups corresponding to the major number of multiple scans in the raster-forming direction for formation of each major raster, where each of the residual rasters is other than the major rasters among the number of rasters constituting the image and is formed by another number of multiple scans different from the major number of multiple scans, and said control data supply module reads the determination results of each classified group with regard to pixels on each major raster as objects of simultaneous dot formation by each of the major number of multiple scans from the classified storage of the determination results and supplies the read determination results of each classified group to said printing unit, said control data supply module selecting the determination results with regard to pixels on each residual raster as objects of simultaneous dot formation by each of the residual number of multiple scans from the classified storage of the determination results and supplying the selected determination results to said printing unit.

10. A print control device in accordance with claim 8, wherein said determination result storage module stores the determination results with regard to plural pixels on each of residual rasters in a sequence of pixel arrays on the image, where each of the residual rasters is other than the major rasters among the number of rasters constituting the image and is formed by another number of multiple scans different from the major number of multiple scans, and said control data supply module reads the determination results of each classified group with regard to pixels on each major raster as objects of simultaneous dot formation by each of the major number of multiple scans from the classified storage of the determination results and supplies the read determination results of each classified group to said printing unit, said control data supply module selecting the determination results with regard to pixels on each residual raster as objects of simultaneous dot formation by each of the residual number of multiple scans from the storage of the determination results and supplying the selected determination results to said printing unit.

11. A print control method that supplies control data to a printing unit to control image printing, where said printing unit has a raster formation assembly that is scanned in a raster-forming direction relative to a printing medium and completes each raster or each dot line on the printing medium by a preset number of multiple scans, said method comprising:

receiving object image data representing an object image to be printed;

determining dot on-off state with regard to a number of pixels constituting the object image, based on the received image data;

classifying determination results representing dot on-off state of plural pixels on each raster into multiple groups according to allocation of the preset number of multiple scans to raster formation in the plural pixels on the raster and storing the determination results classified in the multiple groups; and reading the determination results of each classified group from storage of said determination result storage module synchronously with each scan of the raster formation assembly in the raster-forming direction, and supplying the read determination results of each classified group to said printing unit as the control data for controlling dot formation by the raster formation assembly.

12. A print control method in accordance with claim 11, wherein said classifying and storing step sets a unit of each classified group to an integral multiple of a standard data volume adopted for data transmission, and classifies and stores the determination results representing the dot on-off state of the plural pixels on each raster into the multiple groups of the set units.

13. A computer program product comprising a computer-readable storage medium and a computer program stored in the computer-readable storage medium, said computer program causing a computer to supply control data to a printing unit to print an image, where said printing unit has a raster formation assembly that is scanned in a raster-forming direction relative to a printing medium and completes each raster or each dot line on the printing medium by a preset number of multiple scans, and said computer program causing the computer to implement functions including:

a first function of receiving object image data representing an object image to be printed;

a second function of determining dot on-off state with regard to a number of pixels constituting the object image, based on the received image data;

a third function of classifying determination results representing dot on-off state of plural pixels on each raster into multiple groups according to allocation of the preset number of multiple scans to raster formation in the plural pixels on the raster and storing the determination results classified in the multiple groups; and a fourth function of reading the determination results of each classified group from storage of said determination result storage module synchronously with each scan of the raster formation assembly in the raster-forming direction, and supplying the read determination results of each classified group to said printing unit as the control data for controlling dot formation by the raster formation assembly.

14. A computer program product in accordance with claim 13, wherein said third function sets a unit of each classified group to an integral multiple of a standard data volume adopted for data transmission, and classifies and stores the determination results representing the dot on-off state of the plural pixels on each raster into the multiple groups of the set units.

* * * * *